US010262547B2

(12) United States Patent
Deane et al.

(10) Patent No.: US 10,262,547 B2
(45) Date of Patent: Apr. 16, 2019

(54) GENERATING SCORES AND FEEDBACK FOR WRITING ASSESSMENT AND INSTRUCTION USING ELECTRONIC PROCESS LOGS

(71) Applicant: Educational Testing Service, Princeton, NJ (US)

(72) Inventors: Paul Deane, Lawrenceville, NJ (US); Gary Feng, Princeton, NJ (US); Mo Zhang, Plainsboro, NJ (US); Jiangang Hao, Princeton, NJ (US); Yoav Bergner, Long Island City, NY (US); Michael Flor, Lawrenceville, NJ (US); Michael E. Wagner, Pennington, NJ (US); Nathan Lederer, Lakewood, NJ (US); Yigal Attali, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 359 days.

(21) Appl. No.: 14/937,164

(22) Filed: Nov. 10, 2015

(65) Prior Publication Data
US 2016/0133147 A1 May 12, 2016

Related U.S. Application Data

(60) Provisional application No. 62/077,589, filed on Nov. 10, 2014, provisional application No. 62/131,290, (Continued)

(51) Int. Cl.
G09B 7/00 (2006.01)
G09B 7/02 (2006.01)

(52) U.S. Cl.
CPC .................................. *G09B 7/02* (2013.01)

(58) Field of Classification Search
CPC ........ G09B 7/02; G06F 17/24; G06F 17/2288
(Continued)

(56) References Cited

U.S. PATENT DOCUMENTS 6,254,395 B1* 7/2001 Breland ................... G09B 7/02
434/156
2002/0156816 A1* 10/2002 Kantrowitz ........... G06F 17/273
715/256

(Continued)

OTHER PUBLICATIONS

Abbott, Robert, Berninger, Virginia, Fayol, Michel; Longitudinal Relationships of Levels of Language in Writing and Between Writing and Reading in Grades 1 to 7; Journal of Educational Psychology, 102(2); pp. 281-298; 2010.
(Continued)

*Primary Examiner* — Peter Egloff
(74) *Attorney, Agent, or Firm* — Jones Day

(57) ABSTRACT

Systems and methods are provided for scoring a constructed response generated by a user and providing information on the user's writing behavior. A constructed response and associated electronic process log are received. The constructed response is processed to generate first feature values representative of aspects of the constructed response. The electronic process log is processed to generate second feature values related to the user's actions in generating the constructed response. A score for the constructed response is generated using the processing system by applying a computer scoring model to the first and second feature values. A rule of a rule engine that is satisfied is identified, the rule being satisfied when one or more feature values of the second feature values meet a condition associated with the rule. Information on the user's actions in generating the constructed response is provided based on the satisfied rule.

19 Claims, 25 Drawing Sheets

Related U.S. Application Data filed on Mar. 11, 2015, provisional application No. 62/240,775, filed on Oct. 13, 2015.

(58) Field of Classification Search
USPC .................................................. 434/227, 353
See application file for complete search history.

(56) References Cited

U.S. PATENT DOCUMENTS

| | | | | |
|---|---|---|---|---|
| 2006/0105303 | A1* | 5/2006 | Ames | G09B 19/00 434/165 |
| 2012/0329014 | A1* | 12/2012 | Pham | G09B 19/00 434/169 |
| 2013/0157235 | A1* | 6/2013 | Ellsworth, Jr. | G09B 13/04 434/227 |
| 2013/0227402 | A1* | 8/2013 | Rossen-Knill | G06F 11/3438 715/255 |

OTHER PUBLICATIONS

Alamargot, Denis, Chanquoy, Lucile; Through the Models of Writing, vol. 9; Springer: Amsterdam, Netherlands; 2001.

Alamargot, Denis, Fayol, Michel; Modelling the Development of Written Composition; In Handbook of Writing Development; Sage Publishers: United Kingdom; pp. 23-47; Jul. 2009.

Almond, Russell, Deane, Paul, Quinlan, Thomas, Wagner, Michael, Sydorenko, Tetyana; A Preliminary Analysis of Keystroke Log Data From a Timed Writing Task; Educational Testing Service, Research Report RR-12-23; Nov. 2012.

Alves, Rui Alexandre, Branco, Marta, Castro, Sao Luis, Olive, Thierry; Effects of Handwriting Skill, Output Modes, and Gender on Fourth Graders' Pauses, Language Bursts Fluency, and Quality; Ch. 16 in Past, Present, and Future Contributions of Cognitive Writing Research to Cognitive Psychology, V. Berninger (Ed.); Psychology Press: New York, NY; pp. 389-402; 2012.

Andersson, Bodil, Dahl, Johan, Holmqvist, Kenneth, Holsanova, Jana, Johansson, Victoria, Karlsson, Henrik, Stromqvist, Sven, Tufvesson, Sylvia, Wengelin, Asa; Combining Keystroke Logging with Eye-Tracking; In Writing and Digital Media, L. Van Waes et al. (Eds.); Elsevier: Amsterdam, Netherlands; pp. 166-172; 2006.

Baaijen, Veerle, Galbraith, David, De Glopper, Kees; Keystroke Analysis: Reflections on Procedures and Measures; Written Communication, 29(3); pp. 246-277; Jul. 2012.

Beauvais, Caroline, Olive, Thierry, Passerault, Jean-Michel; Why Are Some Texts Good and Others Not? Relationship Between Text Quality and Management of the Writing Processes; Journal of Educational Psychology, 103 (2); pp. 415-428; 2011.

Bennett, Randy; CBAL: Results from Piloting Innovative K-12 Assessments; Educational Testing Service, Research Report RR-11-23; Jun. 2011.

Bennett, Randy, Gitomer, Drew; Transforming K-12 Assessment: Integrating Accountability Testing, Formative Assessment and Professional Support; Educational Testing Service, Research Memorandum RM-08-13; Jul. 2008.

Bereiter, Carl, Scardamalia, Marlene; The Psychology of Written Composition; Routledge; 1987.

Berninger, Virginia; Reading and Writing Acquisition: A Developmental Neuropsychological Perspective; Brown & Benchmark: Madison, WI; 1994.

Berninger, Virginia; Coordinating Transcription and Text Generation in Working Memory During Composing: Automatic and Constructive Processes; Learning Disability Quarterly, 22(2); pp. 99-112; May 1999.

Breetvelt, Iris, Van Den Bergh, Huub, Rijlaarsdam, Gert; Relations Between Writing Processes and Text Duality: When and How?; Cognition and Instruction, 12(2); pp. 103-123; 1994.

Chenoweth, N. Ann, Hayes, John; the Inner Voice in Writing; Written Communication, 20(1); pp. 99-118; Jan. 2003.

Donnelly, Vincent, Dockrell, Julie, Walter, Kirsty, Critten, Sarah; Predicting the Quality of Composition and Written Language Bursts From Oral Language, Spelling, and Handwriting Skills in Children With and Without Specific Language Impairment; Written Communication, 29(3); pp. 278-302; Jul. 2012.

Deane, Paul, Quinlan, Thomas; What Automated Analyses of Corpora Can Tell Us About Students' Writing Skills; Journal of Writing Research, 2(2); pp. 151-177; 2010.

Deane, Paul, Quinlan, Thomas, Kostin, Irene; Automated Scoring Within a Developmental, Cognitive Model of Nriting Proficiency; Educational Testing Service, Research Report RR-11-16; Apr. 2011.

Deane, Paul, Fowles, Mary, Baldwin, Douglas, Persky, Hilary; The CBAL Summative Writing Assessment: A Draft Eighth-Grade Design; Educational Testing Service, Research Memorandum RM-11-01; Mar. 2011.

Deane, Paul; Using Writing Process and Product Features to Assess Writing Quality and Explore How Those Features Relate to Other Literacy Tasks; Educational Testing Service, Research Report RR-14-03; Jun. 2014.

Flower, Linda, Hayes, John; A Cognitive Process Theory of Writing; College Composition and Communication, 32 (4); pp. 365-387; Dec. 1981.

Fu, Jianbin, Chung, Seunghee, Wise, Maxwell; Statistical Report of Fall 2009 CBAL Writing Tests; Educational Testing Service, Research Memorandum RM-13-01; Feb. 2013.

Graham, Steve, Berninger, Virginia, Abbott, Robert, Abbott, Sylvia, Whitaker, Dianne; Role of Mechanics in Composing of Elementary School Students: A New Methodological Approach; Journal of Educational Psychology, 89(1); pp. 170-182; Mar. 1997.

Hayes, John; Modeling and Remodeling Writing; Written Communication, 29(3); pp. 369-388; Jul. 2012.

Hayes, John, Flower, Linda; Identifying the Organization of Writing Processes; Ch. 1 in Cognitive Processes in Writing, L. Gregg & E. Steinberg (Eds.); Erlbaum: Hillsdale, NJ; pp. 3-30; 1980.

Jakobsen, Arnt Lykke; Research Methods in Translation—Translog; Ch. 6 in Computer Key-Stroke Logging and Writing, vol. 18, K. Sullivan & E Lindgren (Eds.); Elsevier: Amsterdam, Netherlands; pp. 95-105; 2006.

Kaufer, David, Hayes, John, Flower, Linda; Composing Written Sentences; Research in the Teaching of English, 20(2); pp. 121-140; May 1986.

Kellogg, Ronald; Competition for Working Memory Among Writing Processes; The American Journal of Psychology, 114(2); pp. 175-191; 2001.

Kellogg, Ronald; Training Writing Skills: A Cognitive Developmental Perspective; Journal of Writing Research, 1(1); pp. 1-26; 2008.

Leijten, Marielle, Van Waes, Luuk; Inputlog: New Perspectives on the Logging of On-Line Writing Processes in a Windows Environment; Ch. 5 in Studies in Writing,vol. 18, K. Sullivan & E. Lindgren (Eds.); Elsevier: Oxford, UK; pp. T3-93; 2006.

Leijten, Marielle, Van Waes, Luuk; Keystroke Logging in Writing Research: Using Inputlog to Analyze and Visualize Writing Processes; Written Communication, 30(3); pp. 358-392; Jul. 2013.

Limpo, Teresa, Alves, Rui; Modeling Writing Development: Contribution of Transcription and Self-Regulation to Portugese Students' Text Generation Quality; Journal of Educational Psychology, 105(2); pp. 401-413; May 2013.

McCutchen, Deborah; A Capacity Theory of Writing: Working Memory in Composition; Educational Psychology Review, 8(3); pp. 299-325; Sep. 1996.

McCutchen, Deborah; Knowledge, Processing, and Working Memory: Implications for a Theory of Writing; Educational Pyschologist, 35(1); pp. 13-23; 2000.

Miller, Kristyan; Academic Writers On-line: Investigating Pausing in the Production of Text; Language Teaching Research, 4(2); pp. 123-148; Apr. 2000.

Perl, Sondra; The Composing Processes of Unskilled College Writers; Research in the Teaching of English, 13(4); pp. 317-336; Dec. 1979.

Stromqvist, Sven, Holmqvist, Kenneth, Johansson, Victoria, Karlsson, Henrik,Wengelin, Asa; What Keystroke-Logging Can Reveal

(56) References Cited

OTHER PUBLICATIONS

About Writing;Ch. 4 in Computer Key-Stroke Logging and Writing: Methods and Applications (Studies in Writing), vol. 18; Elsevier; pp. 45-72; 2006.

Tillema, Marion, Van Den Bergh, Huub, Rijlaarsdam, Gert, Sanders, Ted; Relating Self Reports of Writing Behaviour and Online Task Execution Using a Temporal Model; Metacognition Learning, 6(3); pp. 229-253; 2011.

Torrance, Mark, Galbraith, David; The Processing Demands of Writing; Ch. in Handbook of Writing Research, C. MacArthur et al. (Eds.); Guilford Publications: New York, NY; pp. 67-80; 2006.

Van Den Bergh, Huub, Rijlaarsdam, Gert; Changes in Cognitive Activities During the Writing Process and Relationships with Text Quality; Educational Psychology, 21(4); pp. 373-385; 2001.

Van Waes, Luuk, Leijten, Marlene, Neuwirth, Christine; Logging Writing Processes with Inputlog; Writing and Digital Media, 17; pp. 158-165; 2005.

Wengelin, Asa; Examining Pauses in Writing: Theory, Methods and Empirical Data; Ch. 7 in Computer Key-Stroke Logging and Writing: Methods and Applications (Studies in Writing), vol. 18; Elsevier; pp. 107-130; 2006.

\* cited by examiner

| XML Doctype Declaration | Explanation |
|---|---|
| <!ELEMENT Responses (Response+)> | A keystroke log consists of the Responses element, which contains a list of individual Response elements. Each Response contains all of the information about one individual's response to a particular prompt on a specific occasion. |
| <!ELEMENT Response (KeyboardingBlocks, KeyLogEvents,RawResponse)> | An individual Response element contains three sub-elements: KeyboardingBlocks, which contains text segments such as individual words, sequences of delimiters, deleted word sequences, etc.; KeyLogEvents, which contains individual keystroke events, and RawResponse, which contains the final submitted text. |
| <!ELEMENT KeyboardingBlocks (KeyboardingBlock+)> | The KeyboardingBlocks element contains a list of KeyboardingBlock elements, which provide a token- and sequence-level analysis of the course of text production. It tracks actions at the level of producing or deleting such units, and groups those segments into larger units that correspond to phrasal bursts of text production |
| <!ELEMENT KeyboardingBlock (Variants?,InterKeyIntervals?,KeyStrokes?)> | Each KeyboardingBlock is associated with three sub-elements: Variants, which contains a list of variant forms produced in the same word location during text production, InterKeyIntervals, the sequence of time differences, and Keystrokes, the sequence of individual keystrokes. |
| <!ELEMENT Variants (Variant+)> | The Variants element contains a list of individual Variant elements. |
| <!ELEMENT Variant EMPTY> | Each individual Variant element is a string that was produced during the production of a word, but which is not a prefix of the final word form. This indicates possible alternate words, misspellings, typos and false starts that took place during the course of producing the word. |
| <!ELEMENT InterKeyIntervals (InterKeyInterval+)> | The InterKeyIntervals element contains a list of InterKeyInterval elements. |
| <!ELEMENT InterKeyInterval EMPTY> | Each InterKeyInterval element specifies the time between a keystroke event and the one before it. Only the InterKeyIntervals associated with a particular KeyboardingBlock appear in this structure. |
| <!ELEMENT KeyStrokes (KeyStroke+)> | The KeyStrokes element contains a list of individual KeyStroke records. |
| <!ELEMENT KeyStrokes EMPTY> | Each KeyStroke element captures information about the sequence of additions and deletions that took place to produce the current KeyboardingBlock. |
| <!ELEMENT KeyLogEvents (KeyLogEvent+)> | The KeyLogEvents element contains a list of individual KeyLogEvent records (which includes the original keystroke log data). |
| <!ELEMENT KeyLogEvent EMPTY> | Each KeyLogEvents contains the raw data from the keystroke log plus additional information from a finite state engine capturing states such as insertions, jumps and backspacing. |
| <!ELEMENT RawResponse ANY> | Each RawResponse element contains the final form of the student essay. |

FIG. 8A

KEYLOGEVENT ATTRIBUTES

| | |
|---|---|
| <!ATTLIST KeyLogEvent | Each KeyLogEvent has a set of attributes associated with it that capture features of that specific keystroke event. |
| sequenceIndex CDATA #IMPLIED | The sequenceIndex attribute is read directly off the sequence of keystrokes with an individual response. It's a simple sequential index to the list of keystrokes that make up that response. |
| TimeStamp CDATA #IMPLIED | The TimeStamp attribute captures the timestamp reported in the original keystroke log. |
| PositionInText CDATA #IMPLIED | The PositionInText attribute captures the position of the cursor reported in the original keystroke log. |
| IsJump CDATA #IMPLIED | The IsJump attribute indicates whether the position has jumped to a different location than would be implied by sequential deletion or insertion. |
| JumpDistance CDATA #IMPLIED | The JumpDistance attribute captures the difference between the original position and the position jumped to. |
| Deleted CDATA #IMPLIED | The Deleted attribute captures the "old" text or deleted text indicated in the original keystroke log. |
| Added CDATA #IMPLIED | The Added attribute captures the "new" text or deleted text indicated in the original keystroke log. |
| Operation (Insert \|Delete \|Cut \|Paste \|Replace \|StartSession \|ResumeSession \|CallFeedback) "Insert" | The Operation attribute captures the type of action taken in this individual keystroke. It includes text actions (insert, delete, cut, paste, replace), where cut and paste imply multiple (>3) characters deleted or inserted. It also includes session actions such as starting a session, resuming a session after a break of some kind such as the browser being killed, and an interrupt to call feedback. |
| Editing Event CDATA #IMPLIED | The EditingEvent is a string that shows on what event particular events indicated elsewhere in the log were identified, such as correcting a spelling error. |
| AfterLastAlphanumericCharacter (Yes\|No) "No" | The AfterLastAlphanumericCharacter attribute indicates whether the cursor was at the end of visible produced text – the location that corresponds to direct composition of new material without any editing. |
| currentWordToDate CDATA #IMPLIED | The currentWordToDate attribute captures the word the cursor is currently located on (if any). If it isn't already a complete word, all that's shown is the part that has already been typed. |
| ValidWordSoFar (Yes\|No) "No" | The ValidWordSoFar attribute captures whether the word the cursor is currently located on is a prefix of a validly spelled word. |
| ValidWord (Yes\|No) "No" | The ValidWord attribute captures whether the word the cursor is currently located on is a validly spelled word in a large spelling lexicon. |
| BackspaceStart (Yes\|No) "No" | The BackspaceStart attribute indicates whether the location is the start of a backspace sequence. |

FIG. 8B

KEYLOGEVENT ATTRIBUTES (CONTINUED)

| | |
|---|---|
| KeyboardingState (BEGIN\|END\|BackSpace\|Edit\|Error\|InWord\|BetweenWord\|BetweenSentence\|BetweenParagraph\|FeedbackCall\|Feedback Return\|ResumeSession) "In Word" | The KeyboardingState attribute indicates states of a finite state machine, as modified to add session states. It includes states to recognize sequences of backspace keys, other editing actions, or whether insertion is in a word, between words, between sentences, between paragraphs. These states do not include much parsing of what happens when large inserts or deletes happen; the segments reported in the KeyboardingBlock part of the log are more accurate. |
| OldJumpFlag CDATA #IMPLIED | Jump flag |
| AtEnd CDATA #IMPLIED | An AtEnd flag for actions at the end of produced text |
| OrigLog CDATA #IMPLIED | This is the original JSON data for this keystroke event. |
| TextToDate CDATA #IMPLIED | This is the text produced to date |

KEYBOARDINGBLOCK ATTRIBUTES

| | |
|---|---|
| <!ATTLIST KeyboardingBlock | Each KeyboardingBlock is a sequence of keystrokes that adds up to a meaningful event – a word produced, a sequence of words deleted or inserted, a delimiter such as spaces or punctuation. |
| StateEntry CDATA #IMPLIED | The StartEntry attribute indicates the sequenceIndex of the first KeyLogEvent to be assigned to this block. |
| EndEntry CDATA #IMPLIED | TheEndEntry attribute indicates the sequenceIndex of the last KeyLogEvent to be assigned to this block. |
| BurstNo CDATA #IMPLIED | If a sequence of KeyboardingBlocks follow without a long pause, then all of these KeyboardingBlock elements are assigned the same BurstNo, which indicates that they belong to a "phrasal" burst—typically more than one word, though not necessarily. |
| InitialPause CDATA #IMPLIED | The InitialPause attribute is the InterKeyInterval from the last character of the previous KeyboardingBlock to the first character of this block. It captures hesitancy that might reflect planning or buffering of spelling information before producing the current unit. Only insertions count as InitialPause interkey intervals. |
| FinalPause CDATA #IMPLIED | The FinalPause attribute is the InterKeyInterval from the next-to-last to the last character of this KeyboardingBlock. It may capture hesitancy that preceded difficulties preparing to produce the next segment. It is only defined if there are more than two characters in the KeyboardingSequence. Only insertions count as FinalPause interkey intervals. |
| MaxMedialPause CDATA #IMPLIED | The MaxMedialPause attribute reports the largest InterKeyInterval for characters in the center of the KeyboardingBlock. It captures the largest indication of hesitancy that occurred somewhere other than at the start or end of the segment. Only insertions count as MaxMedialPause interkey intervals. |
| MaxEditPause CDATA #IMPLIED | The MaxEditPause attribute reports the largest InterKeyInterval for deletion of characters (other than for multichar deletions). It captures indications of hesitancy associated with editing rather than text production. |
| NumVariants CDATA #IMPLIED | The NumVariants attribute indicates how many variant forms were detected for this word (and is in fact only defined for words; otherwise its value will be zero). Variants are sequences of characters that are NOT prefixes of the final form produced. |

FIG. 8C

KEYBOARDINGBLOCK ATTRIBUTES (CONTINUED)

| | |
|---|---|
| BurstStatus (InBurst\|BetweenBursts \|OneWordBurst \|AtBurstEnd \|AtBurstStart \|Edit Burst \|Not Applicable) "NotApplicable" | The BurstStatus attribute captures the relationship between this KeyboardingBlock and the sequence of phrasal bursts identified by the BurstNo attribute. InBurst means it's neither preceded nor followed by long pauses. AtBurstStart indicates that there is a long pause indicating a break between this KeyboardingEvent and the last one. AtBurstend indicates that there is a long pause indicating a break between this KeyboardingEvent and the next one. BetweenBursts indicates that this KeyboardingBlock is an isolate—there are long pauses both before and after it. If the Keyboarding Block is between bursts but is also an alphanumeric word, it is labeled a OneWordBurst instead. |
| ChunkType (Word \|Delimiter \|InsertedSequence \|DeletedSequence \|ReplacedSequence \|AfterDeletedSequence) "Delimiter" | The ChunkType attribute classifies the KeyboardingBlock into major meaningful types. One of them (AfterDeletedSequence) can overlap with other blocks.

Most text will be word (alphanumeric character sequences) or Delimiter (everything else). Deletions within a word are not tracked here. InsertedSequence, DeletedSequence, and ReplacedSequence are sequences of edits that cross at least one word boundary. AfterDeletedSequence is a block that is used to carry information about what happens after a multiword deletion—whether the writer retypes the same information, or start an entirely different sentence. The details are carried on the EditType attribute. |
| DelimiterType (EndWordSpace \|OtherWhiteSpace \|EndSentencePunctuation \|InSentencePunctuation \|LineOrParagraphBreak \|Not Applicable) "NotApplicable" | The DelimiterType attribute is only defined for delimiters, and provides a subclassification: EndWordSpace for typical whitespace between words, OtherWhiteSpace for such things as the multiple whitespace needed to indent a paragraph, EndSentencePunctuation for periods, question marks, and exclamation marks (and attached whitespace), InSentencePunctuation for other punctuation marks with attached whitespace, and LineOrParagraphBreak for whitespace that contains newlines and thus may indicate a paragraph break. |
| OutsideProductionRate CDATA #IMPLIED | The OutsideProductionRate attribute is only defined for InsertedSequence and Replaced Sequence KeyboardingBlocks. It is used to provide some extra information about multiple word inserts or replacements. These could reflect either cut-and-paste or composition outside the text box window that is then pasted into the application. The total time occupied by the multiword insert or replace is divided by the number of characters in it. |
| EditType (NoEditing \|MinorEditing \|MajorEditing \|Not Applicable \|RetypedChunk \|TypoCorrectedChunk \|EditedChunk \|NewContentChunk) "NoEditing" | The EditType attribute tracks editing behaviors. NoEditing applies to pure insertion within a KeyboardingBlock. MinorEditing and MajorEditing apply to KeyboardingBlock elements that are classified as words—if the changes are small, MinorEdit; MajorEdit only for larger changes. The difference is defined in terms of Levenshtein distance (not more than 2 except for short initial prefixes, where what matters is that the common prefix shows the edit was on the track to producing the same final text. MajorEdit and/or MinorEdit will be triggered by any editing during the course of producing a single alphanumeric KeyboardingChunk. |

FIG. 8D

KEYBOARDINGBLOCK ATTRIBUTES (CONTINUED)

| | |
|---|---|
| SpellingStatus (CorrectlySpelled \|Misspelled \|SpellingCorrected \|Not Applicable) "NotApplicable" | The SpellingStatus attribute tracks spelling status of words at the end of their KeyboardingBlock. If correctly spelled throughout, the value is CorrectlySpelled. But if a misspelling was corrected in the course of typing, the status is SpellingCorrected. If still misspelled when the cursor is no longer on this word, the status is Misspelled. |
| WordChoice (Yes \|No) "No" | The WordChoice attribute is true only for some edited words. If the variants of a word are not interpretable as a typo with backtracking—such as 'The' as a variant for 'Giving' it is inferred that this was probably hesitation about word choice, not spelling or some other matter, and set the value of WordChoice to 'Yes'. Otherwise it is 'No'. |
| ProbableTypo (Yes \|No) "No" | The ProbableTypo attribute is only defined for misspelled words. It indicates either (a) that the word is valid if the last character is removed or (b) that there is a word produced earlier in the text that's only one or two edits different that is correctly spelled. It is inferred that this word is likely to be a typo, not a failure in spelling knowledge. |
| InitialJump (Yes \|No) "No" | The InitialJump attribute indicates that there was a jump at the start of this keyboarding block. |
| InternalJump (Yes \|No) "No" | The InternalJump attribute indicates that there was at least one jump INSIDE this keyboarding block, indicating ongoing edit of this same unit rather than switching into a different block of the text. |
| FinalJump (Yes \|No) "No" | The FinalJump attribute indicates that there was a jump away from this part of the text at the end of this KeyboardingBlock. |
| BeforeLineOrParagraph (Yes \|No) "No" | The BeforeLineOrParagraph attribute indicates that this KeyboardingBlock appeared just before a block that involved a newline. Newlines may be associated with higher-level planning and may be analyzed separately. |
| LineOrParagraphInitial (Yes \|No) "No" | The LineOrParagraphInitial attribute indicates that this KeyboardingBlock appeared just after a block that involved a newline. Newlines may be associated with higher-level planning and blocks at this position may be analyzed separately. |
| SentenceInitial (Yes \|No) "No" | The SentenceInitial attribute indicates that this KeyboardingBlock appeared just after end sentence punctuation. Sentence boundaries may be associated with higher level planning and blocks at this position may be analyzed separately. |
| SentenceFinal (Yes \|No) "No" | The SentenceFinal attribute indicates that this KeyboardkingBlock appeared just before end sentence punctuation. Sentence boundaries may be associated with higher level planning and blocks at this position may be analyzed separately. |
| BeforeInSentencePunctuation (Yes \|No) "No" | The BeforeInSentencePuncfation attribute indicates that this Keyboardingblock appeared just before punctuation that doesn't end a sentence, like a comma. |
| AfterInSentencePunctuation(Yes \|No) "No" | The AfterInSentencePunctuation attribute indicates that this Keyboardingblock appeared just before punctuation that doesn't end a sentence, like comma. |
| FinalText CDATA #IMPLIED | The FinalText attribute contains the actual final token produced in this KeyboardingBlock. It doesn't indicate whether the text might have been edited later, just what it was when the writing went on to some other text unit. |

FIG. 8E

| KEYBOARDINGBLOCK ATTRIBUTES (CONTINUED) | |
|---|---|
| PreEditText CDATA #IMPLIED | The PreEditText attribute is valid for text with variant forms—it shows what the text was like before the last major editing sequence. |
| <!ATTLIST Variant text CDATA #IMPLIED | The actual text of a variant form is stored in the text attribute. |
| <!ATTLIST InterKeyInterval val CDATA #IMPLIED | The actual time value for an interkey interval is stored in the val attribute. |
| <!ATTLIST KeyStroke | The Keystroke element includes both insertions and deletions |
| Added CDATA #IMPLIED | Inserted text is stored in the added attribute. |
| deleted CDATA #IMPLIED | Deleted text is stored in the deleted attribute. |

| RESPONSE ATTRIBUTES | |
|---|---|
| <!ATTLIST Response | The Response element represents the whole log. Attributes assigned to this element are intended as properties of the whole log—including features that might be useful for the purpose of characterizing overall behavior of writers. |
| ResponseSuccessfullyReconstructedFromLog (Yes \|No) "No" | The ResponseSuccessfullyReconstructedFromLog attribute indicates the RawResponse field was reconstructed from the keystroke log. |
| candidateID CDATA #IMPLIED | The candidateID attribute indexes the individual who produced the response. |
| promptID CDATA #IMPLIED | The promptID attribute indexes the specific prompt administered. |
| resultID CDATA #IMPLIED | The resultID attribute indexes the specific session/item in which the response was produced. |
| MaximumPhrasalBurstLength CDATA #IMPLIED | "Phrasal" bursts are calculated—sequences of words in which an intervening pause is greater than four times the writer's own median burst time. |
| AvgPhrasalBurstLength CDATA #IMPLIED | The average number of words in a phrasal burst. This gives some sense of the writer's ability to produce longer spans. |
| StDevPhrasalBurstLength CDATA #IMPLIED | The standard deviation of the number of words in a phrasal burst. Helps identify the extent to which their ability to produce longer spans is modulated by other demands. |
| nchar CDATA #IMPLIED | The nchar attribute indicates the length of the final response. |
| avJumpLength CDATA #IMPLIED | The avJumpLength attribute indicates how many characters long an initial or final jump was (internal jumps excluded). |
| medianJumpLength CDATA #IMPLIED | The medianJumpLength attribute indicates the median jumpLength for all jumps in this response. |
| nInsertedChars CDATA #IMPLIED | nInsertedChars indicates how many characters were added at some point during writing, even if deleted later. |
| nDeletedChars CDATA #IMPLIED | nDeleted Chars indicates how many characters were deleted at some point during writing. |

FIG. 8F

RESPONSE ATTRIBUTES (CONTINUED)

| | |
|---|---|
| nCharactersDeletedInMultiWordDeletions CDATA #IMPLIED | nCharactersDeletedInMultiWord Deletions indicates how many characters were deleted as part of multiword deletions, not as part of word editing. |
| nCharactersDeletedInMultiWordInsertions CDATA #IMPLIED | nCharactersInsertedInMultiWordInsertions indicates how many characters were inserted as part of multiword edits, not as part of normal text production. |
| relativeJumpSize CDATA #IMPLIED | relativeJumpSize normalizes avgJumpSize against nchars. It indicates how local the jumps in the log are. |
| proportionInsertedChars CDATA #IMPLIED | nInsertedChars normalized against (nInsertedChars+nDeletedChars)—how much of the log activity is text production? |
| proportionDeletedChars CDATA #IMPLIED | nDeletedChars normalized against (nInsertedChars+nDeletedChars)—how much of the log activity is deletion? |
| proportionCharsInMultiWordInsertions CDATA #IMPLIED | nCharactersDeletedInMultiWordInsertions normalized against (nInsertedChars+nDeletedChars)—how much of the log activity is multiword insertion? |
| proportionCharsInMultiWordDeletions CDATA #IMPLIED | nCharactersDeletedInMultiWordDeletions normalized against (nInsertedChars+nDeletedChars)—how much of the log activity is multiword deletion? |
| totalTime CDATA #IMPLIED | Length of the keystroke log in seconds. |
| startTime CDATA #IMPLIED | Length of the first pause in the keystroke log, which could reflect planning. |
| totalMultiWordInsertionTime CDATA #IMPLIED | Sum of the time spent on all multiword insertion keyboarding blocks. |
| totalMultiWordDeletionTime CDATA #IMPLIED | Sum of the time spent on all multiword deletion keyboarding blocks, whether accomplished through backspacing or cutting. |
| totalTimeAfterLastChar CDATA #IMPLIED | Sum of the time spent at the very end of the text. The more time here, the less time spent editing, the more in pure composition mode. |
| totalPreJumpPauseTime CDATA #IMPLIED | Sum of the time spent pausing before a jump. A type of deliberation before editing. |
| totalTimeSpentBetweenPharsalBursts CDATA #IMPLIED | Sum of the time spent KeyboardingBlocks classified as between two longer bursts. A possible indicator of hesitancy/deliberation/planning. |
| totalTimeSpentInOneWordBursts CDATA #IMPLIED | Sum of the time spent in KeyboardingBlock classified as one word bursts. A possible indicator of hesitancy/deliberation/planning. |
| totalTimeSpentAtPhrasalBurstStart CDATA #IMPLIED | Sum of the time spent in KeyboardingBlocks classified as at the start of a phrasal burst. A possible indicator of hesitancy/deliberation/planning. |
| totalTimeSpentAtPhrasalBurstEnd CDATA #IMPLIED | Sum of the time spent in Keyboarding Blocks classified as at the end of a phrasal burst. Might indicate problems interfering with normal production. |
| proportionStartTime CDATA #IMPLIED | StartTime normalized against totalTime. |

FIG. 8G

RESPONSE ATTRIBUTES (CONTINUED)

| | |
|---|---|
| proportionTimeAfterLastChar CDATA #IMPLIED | totalTimeAfterLastChar normalized against totalTime. |
| ProportionMultiWordInsertionTime CDATA #IMPLIED | totalMultiWordInsertionTime normalized against totalTime. |
| ProportionMultiWordDeletionTime CDATA #IMPLIED | totalMultiWordDeletionTime normalized against totalTime. |
| ProportionTimeSpentBetweenPhrasalBursts CDATA #IMPLIED | totalTimeSpentBetweenPhrasalBursts normalized against totalTime. |
| ProportionTimeSpentInOneWordBursts CDATA #IMPLIED | totalTimeSpentInOneWordBursts normalized against totalTime. |
| ProportionTimeSpentAtPhrasalBurstStart CDATA #IMPLIED | TotalTimeSpentAtPhrasalBurstStart normalized against total time. |
| ProportionTimeSpentAtPhrasalBurstEnd CDATA #IMPLIED | TotalTimeSpentAtPhrasalBurstEnd normalized against total TimeSpentAtPhrasalBurstEnd. |
| nKeystrokeEvents CDATA #IMPLIED | Total number of KeyLogEvents for this response. |
| numWordStarts CDATA #IMPLIED | Total number of KeyboardingBlocks classified as word—a measure of words produced in the text window, ignoring any words only pasted in. |
| nEventsAfterLastChar CDATA #IMPLIED | Total number of KeyLogEvents that take place at the end of the text, after the last alphanumeric character. |
| numUncorrectedSpellingErrors CDATA #IMPLIED | Total number of KeyboardingBlock words whose final text is out of the spelling vocabulary—a measure not of total number of spelling errors, but of words produced in the text box window that were not corrected before the writer began producing some other word. |
| numMisspelledLikelyTypo CDATA #IMPLIED | Total number of UncorrectedSpellingErrors words that are also very close in edit distance to a likely correctly spelled word previously produced (including one character shorter versions of the current word). |
| numCorrectedTypos CDATA #IMPLIED | Total number of KeyboardingBlock words that were out of vocabulary at some point and so likely a typo, but where the typo was corrected before the final text for this block was produced. |
| numEditedWords CDATA #IMPLIED | Total number of KeyboardingBlock words that were never misspelled, but were nonetheless altered during the course of typing. |
| numMinorEdits CDATA #IMPLIED | Total number of edited words where the deviation from the straight path to creating the final word form is minimal, no more than a couple of edits total. E.g., *gin / giving* is minimal, because you can get back to the straight path to produce *giving* just by deleting the n. |
| numMajorEdits CDATA #IMPLIED | Total number of edited words where the deviation from the straight path is too large to treat as a single simple typo. |

FIG. 8H

RESPONSE ATTRIBUTES (CONTINUED)

| | |
|---|---|
| numWordChoiceEvents CDATA #IMPLIED | Case of word editing where the variant forms look like completely different words. For instance, if 'Giving' has the variants 'THe' and 'Gin', 'Gin' is a minor edit, but 'THe' makes it a word choice event too. |
| nMultiWordDeletions CDATA #IMPLIED | Total number of KeyboardingBlocks that are classified as multi-word deletions. A rough estimate of how often a particular editing behavior is used. |
| nMultiWordInsertions CDATA #IMPLIED | Total number of KeyboardingBlocks that are classified as multi-word insertions. A rough estimate of how often writers are using the strategy or writing or obtaining text outside the text box window. |
| nWordInternalJumps CDATA #IMPLIED | Total number of jump events that happened to take place within the span of single KeyboardingBlock. A measure of local editing behaviors. |
| nLongJumps CDATA #IMPLIED | Total number of jump events that take the writer somewhere else in the text, not to the same KeyboardingBlock. |
| nRetypedChunks CDATA #IMPLIED | Total number of text sequences following a deletion that are essentially just a retyping of what was deleted. |
| nTypoCorrectedChunks CDATA #IMPLIED | Total number of text sequences following a deletion that differ from what was deleted primarily through some minor spell-correction |
| nEditedChunks CDATA #IMPLIED | Total number of text sequences following a deletion that involve significant editing from what was deleted, but maintain similar content. |
| nNewContentChunks CDATA #IMPLIED | Total number of text sequences following a deletion that appear to involve entirely new content. |
| proportion WordStarts CDATA #IMPLIED | The number of Word KeyBoardingBlocks, normalized against the total number of KeyboardingBlocks. |
| proportionEventsAfterLastChar CDATA #IMPLIED | The number of KeyLogEvents that took place after the last alphanumeric character in the text, normalized against the total number of WordStarts. Rate at which the writer is sticking to straight composition without editing of any kind. |
| proportionUncorrectedSpelling Errors CDATA #IMPLIED | Total number of UncorrectedSpellingErrors divided by total number of WordStarts. Spelling error rate. |
| proportionMisspelledLikelyTypo CDATA #IMPLIED | Total number of probable typo misspellings normalized against total number of KeyLog Events. |
| proportionCorrectedTypos CDATA #IMPLIED | Total number of corrected typos normalized against the total number of WordStarts. Rate of self-correction for clear spelling errors. |
| proportionEditedWords CDATA #IMPLIED | Total number of edited words normalized against the total number of WordStarts. Rate of self-correction of typing against typing errors that may not affect spelling accuracy. |
| proportionMinorEdits CDATA #IMPLIED | Total number of MinorEdits normalized against the total number of WordStarts. |
| proportionMajorEdits CDATA #IMPLIED | Total number of MajorEdits normalized against the total number of WordStarts. |

FIG. 8I

RESPONSE ATTRIBUTES (CONTINUED)

| Attribute | Description |
|---|---|
| proportionWordChoiceEvents CDATA #IMPLIED | Total number of WordChoice classified KeyboardingBlocks normalized against the total number of WordStarts. A measure of the extent to which the writer shows signs of deliberating about word choice. |
| proprotionMultiWordDeletions CDATA #IMPLIED | Total number of MultiWordDeletions normalized against the total number KeyLogEvents. |
| proprotionMultiWordInsertions CDATA #IMPLIED | Total number of MultiWordInsertions normalized against the total number of KeyLogEvents. |
| porportionWordInternalJumps CDATA #IMPLIED | Total number of WordInternalJumps normalized against the total number of KeyLogEvents. |
| proportionLongJumps CDATA #IMPLIED | Total number of LongJumps normalized against the total number of KeyLogEvents |
| proportionRetypedChunks CDATA #IMPLIED | Total number of RetypedChunks normalized against the total number of KeyLogEvents |
| proprotionTypoCorrected Chunks CDATA #IMPLIED | Total number of TypoCorrected Chunks normalized against the total number of KeyLogEvents. |
| proportionEditedChunks CDATA #IMPLIED | Total number of EditedChunks normalized against the total number of KeyLogEvents. |
| proportionNewContent Chunks CDATA #IMPLIED | Total number of NewContentChunks normalized against the total number of KeyLogEvents. |
| medianPauseTime CDATA #IMPLIED | Median interkey interval—calculated adaptively as the log proceeds. |
| medianWordInitialPauseTime CDATA #IMPLIED | Median value of InitialPauseTime feature over all words. Measure of general speed of keyboarding. |
| medianMaxWordInternalPauseTime CDATA #IMPLIED | Take the longest internal pause for each word; take the median of this value over all words. |
| medianWordFinalPauseTime CDATA #IMPLIED | Take median value of all word final pauses. |
| medianMaxWordEditingPauseTime CDATA #IMPLIED | Take the longest editing pause for each word; take the median of this value over all words. |
| medianWordSpacePauseTime CDATA #IMPLIED | Median pause length for whitespace between words. |
| medianOtherWhiteSpacePauseTime CDATA #IMPLIED | Median pause length for whitespace that doesn't have a word-separating function. Typically in things like paragraph breaks to provide indents. |
| medianEndSentencePunctuationPauseTime CDATA #IMPLIED | Median pause length to produce end sentence punctuation marks—a measure of pauses at sentence boundaries. |

FIG. 8J

RESPONSE ATTRIBUTES (CONTINUED)

| | |
|---|---|
| medianInSentencePunctuationPauseTime CDATA #IMPLIED | Median pause length to produce sentence-internal punctuation. |
| medianMaxLineOrParaBreakPauseTime CDATA #IMPLIED | In any sequence of whitespace and line break chars, take the longest pause. Then take the median of that over all KeyboardingChunks. |
| medianSentenceInitialPauseTime CDATA #IMPLIED | Take the median of all sentence initial pauses. |
| medianSentenceFinalPauseTime CDATA #IMPLIED | Take the median of all sentence pause times. |
| medianMaxWordChoiceEventPauseTime CDATA #IMPLIED | Take the maximum pause within the sequence of typing events that goes with making a choice between completely different words in the same position. Then take the median of that over all KeyboardBlocks. |
| medianPreJumpPauseTime CDATA #IMPLIED | Take the median pause time for long (non-internal) jump events. |
| medianOutsideProductionRate CDATA #IMPLIED | Take the median over the OutsideProductionRate for all multi-word pastes. |
| legacy_timeAtEnd CDATA #IMPLIED | Sum of time in events where the AtEnd flag is on. |
| legacy_timeInMid CDATA #IMPLIED | Sum of time in events where the AtEnd flag is off. |
| legacy_nBurst CDATA #IMPLIED | Number of 'bursts', where the threshold for defining a burst is 2/3 of a second—which will typically break up keystroke logs at word sized, rather than phrase sized, units. |
| legacy_mlnBurst CDATA #IMPLIED | Sum of logged totals of words in a burst, divided by total number of 2/3 second bursts. |
| legacy_sdlnBurst CDATA #IMPLIED | Standard deviation of number of words in a 2/3 second burst. |
| legacy_tBurst CDATA #IMPLIED | Log of total number of words in a burst, divided by total time. |
| legacy_nBSentence CDATA #IMPLIED | Number of keystroke events in which the BetweenSentence flag is turned on. |
| legacy_minBSentence CDATA #IMPLIED | Log of total time spent in BetweenSentence events, divided by number of BetweenSentence events. |
| legacy_sdlnBSentence CDATA #IMPLIED | Standard deviation of total time spent in BetweenSentence events, normalized against number of BetweenSentence events. |
| legacy_tBSentence CDATA #IMPLIED | Log total time spent in between events, divided by total time. |
| legacy_nBParagraph CDATA #IMPLIED | Number of events in which the BetweenParagraph flg is turned on. |

FIG. 8K

RESPONSE ATTRIBUTES (CONTINUED)

| | |
|---|---|
| legacy_mlnBParagraph CDATA #IMPLIED | Log total time spent with BetweenParagraph flag turned on, divided by number of BetweenParagraph events. |
| legacy_sdlnBParagraph CDATA #IMPLIED | Standard deviation of log total time spent in Between paragraph events, normalized against number of Between Paragraph events. |
| legacy_tBParagraph CDATA #IMPLIED | Log total time spent in between paragraph events, divided by total time. |
| legacy_nSingleBackspace CDATA #IMPLIED | Number of backspace events not followed by another backspace. |
| legacy_mlnSingleBackspace CDATA #IMPLIED | Mean log time spent in single backspace events. |
| legacy_sdlnSingleBackspace CDATA #IMPLIED | Standard deviation of log time spent in single backspace events, normalized against number of single backspace events. |
| legacy_tSingleBackspace CDATA #IMPLIED | Mean log time spent in single backspace events divided by total time. |
| legacy_nMultipleBackspace CDATA #IMPLIED | Number of backspacing sequences observed. |
| legacy_mlnMultipleBackspace CDATA #IMPLIED | Log total time spent in backspacing sequences divided by number of backspacing sequences. |
| legacy_sdlnMultipleBackspace CDATA #IMPLIED | Standard deviation of log time spent in backspacing sequences normalized against number of backspacing sequences. |
| legacy_tMultipleBackspace CDATA #IMPLIED | Log total time spent in backspacing sequences divided by total time. |
| legacy_nCutPasteJump CDATA #IMPLIED | Number of editing events marked by cut/paste and/or jump. |
| legacy_mlnCutPasteJump CDATA #IMPLIED | Log total time spent in cut/paste/jump events divided by number of cut/paste/jump events. |
| legacy_sdlnCutPasteJump CDATA #IMPLIED | Standard deviation of log total time spent in cut/paste/jump vents normalized against number of cut/paste/jump events. |
| legacy_tCutPasteJump CDATA #IMPLIED | Log total time spent in cut/paste/jump events divided by total time. |
| legacy_nBurstDuration CDATA #IMPLIED | Number of 2/3 second bursts. |
| legacy_mlnBurstDuration CDATA #IMPLIED | Log total time spent in 2/3 second bursts divided by the number of 2/3 second bursts. |
| legacy_sdlnBurstDuration CDATA #IMPLIED | Standard deviation of log total time spent in 2/3 second bursts, normalized against number of bursts. |

FIG. 8L

| RESPONSE ATTRIBUTES (CONTINUED) | |
|---|---|
| legacy_tBurstDuration CDATA #IMPLIED | Log total time spent in 2/3 second bursts divided by total time. |
| legacy_nInWord CDATA #IMPLIED | Number of keystroke events in which the InWord flag is turned on. |
| legacy_mInInWord CDATA #IMPLIED | Log total time in keystroke events in which the InWord flag was turned on, divided by number of InWord keystroke events. |
| legacy_sdInInWord CDATA #IMPLIED | Standard deviation of log total time InWord keystroke events, normalized against number of InWord keystroke events. |
| legacy_sdInInWord CDATA #IMPLIED | Log total time in InWord keystroke events, divided by total time. |
| legacy_nBWord CDATA #IMPLIED | Number of events in which the BetweenWord flag was turned on. |
| legacy_mInBWord CDATA #IMPLIED | Log total time in events in which the BetweenWord flag was turned on, divided by the number of BetweenWord events. |
| legacy_sdInBWord CDATA #IMPLIED | Standard deviation of log total time in BetweenWord events, normalized against number of BetweenWord events. |
| legacy_tBWord CDATA | Log total time in BetweenWord events, divided by total time. |

FIG. 8M

GENERATING SCORES AND FEEDBACK FOR WRITING ASSESSMENT AND INSTRUCTION USING ELECTRONIC PROCESS LOGS

CROSS-REFERENCE TO RELATED APPLICATIONS

This application claims priority to U.S. Provisional Patent Application No. 62/077,589, filed Nov. 10, 2014, entitled "Systems and Methods for Dynamically Combining Data from Keystroke Logs and an Automated Scoring Engine to Generate Scores and Feedback for Assessment and Instruction," U.S. Provisional Patent Application No. 62/131,290, filed Mar. 11, 2015, entitled "Systems and Methods for Dynamically Combining Data from Keystroke Logs and an Automated Scoring Engine to Generate Scores and Feedback for Assessment and Instruction," and U.S. Provisional Patent Application No. 62/240,775, filed Oct. 13, 2015, entitled "A Method for Displaying and Analyzing Keystroke Logs to Support Writing Assessment and Instruction," which are incorporated herein by reference in their entireties.

FIELD

This disclosure is related generally to automated test response evaluation and more particularly to utilization of process metrics in determining an automated score or providing feedback on a user's writing behavior, proficiency, or practice.

BACKGROUND

Students are tested for a variety of purposes (e.g., to determine students' understanding of a concept, vocabulary knowledge, etc.). One method of testing students utilizes test questions that require a constructed response. Examples of constructed responses include free-form, non-multiple choice responses such as essays, spoken responses, or show-your-work math responses. Conventionally, one or more human graders review students' constructed responses and manually assign scores to the constructed responses. The graders' evaluation thus focuses on the final written products produced by the students (i.e., the constructed responses in their final, submitted form). Automated scoring systems have been developed for evaluating students' constructed responses. Similar to the aforementioned manual scoring methods, the automated scoring systems are configured to score the final written products produced by the students.

SUMMARY

Systems and methods are provided for scoring a constructed response generated by a user and providing information on the user's writing behavior. In an example computer-implemented method, a constructed response generated by a user is received. An electronic process log for the constructed response is received. The electronic process log comprises a plurality of time-stamped entries, with each of the entries being associated with a keystroke made by the user in generating the constructed response and indicating a change in text of the constructed response due to the keystroke. The constructed response is processed with a processing system to generate first feature values representative of aspects of the constructed response. The electronic process log is processed with the processing system to generate second feature values related to the user's actions in generating the constructed response. A score for the constructed response is generated using the processing system by applying a computer scoring model to the first and second feature values. The computer scoring model includes multiple weighted variables determined by training the computer scoring model relative to a plurality of training texts. A rule of a rule engine that is satisfied is identified, the rule being satisfied when one or more feature values of the second feature values meet a condition associated with the rule. Information on the user's actions in generating the constructed response is provided based on the satisfied rule.

An example system for scoring a constructed response generated by a user and providing information on the user's writing behavior includes a processing system and computer-readable memory in communication with the processing system encoded with instructions for commanding the processing system to execute steps. In executing the steps, a constructed response generated by a user is received. An electronic process log for the constructed response is received. The electronic process log comprises a plurality of time-stamped entries, with each of the entries being associated with a keystroke made by the user in generating the constructed response and indicating a change in text of the constructed response due to the keystroke. The constructed response is processed to generate first feature values representative of aspects of the constructed response. The electronic process log is processed to generate second feature values related to the user's actions in generating the constructed response. A score for the constructed response is generated by applying a computer scoring model to the first and second feature values. The computer scoring model includes multiple weighted variables determined by training the computer scoring model relative to a plurality of training texts. A rule of a rule engine that is satisfied is identified, the rule being satisfied when one or more feature values of the second feature values meet a condition associated with the rule. Information on the user's actions in generating the constructed response is provided based on the satisfied rule.

An example non-transitory computer-readable storage medium for scoring a constructed response generated by a user and providing information on the user's writing behavior comprises computer executable instructions which, when executed, cause a processing system to execute steps. In executing the steps, a constructed response generated by a user is received. An electronic process log for the constructed response is received. The electronic process log comprises a plurality of time-stamped entries, with each of the entries being associated with a keystroke made by the user in generating the constructed response and indicating a change in text of the constructed response due to the keystroke. The constructed response is processed to generate first feature values representative of aspects of the constructed response. The electronic process log is processed to generate second feature values related to the user's actions in generating the constructed response. A score for the constructed response is generated by applying a computer scoring model to the first and second feature values. The computer scoring model includes multiple weighted variables determined by training the computer scoring model relative to a plurality of training texts. A rule of a rule engine that is satisfied is identified, the rule being satisfied when one or more feature values of the second feature values meet a condition associated with the rule. Information on the user's actions in generating the constructed response is provided based on the satisfied rule.

BRIEF DESCRIPTION OF THE DRAWINGS

FIG. 3 depicts example entries of an electronic process log.

FIGS. 8A-8M are tables depicting example features utilized in the systems and methods described herein.

DETAILED DESCRIPTION

Figure 1:
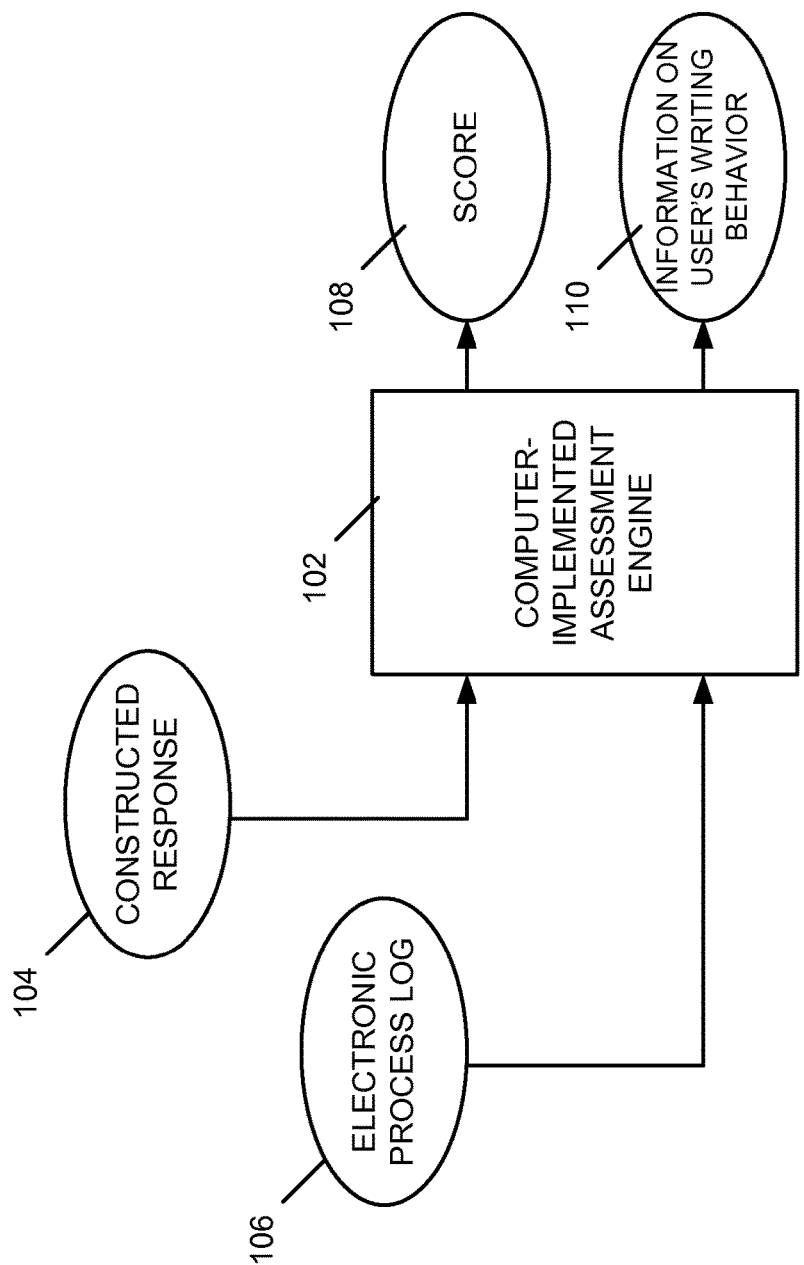
FIG. 1 is a block diagram an example system for scoring a constructed response generated by a user and providing information on the user's writing behavior.

FIG. 1 is a block diagram an example system for automatically scoring a constructed response 104 generated by a user and providing information on the user's writing behavior. In an example, the constructed response 104 is a textual response that is generated by the user in response to a given item (e.g., a test question, task, etc.). In generating the constructed response 104, the user uses a keyboard. The keyboard may be a hardware keyboard (e.g., a hardware keyboard used with a desktop or laptop computer, smartphone, personal digital assistant (PDA), etc.) or a software keyboard (e.g., an on-screen keyboard that utilizes a touchscreen, mouse, or other input device to operate virtual keys). The user may use other input devices, along with the keyboard, in generating the constructed response 104. For example, the user may use a mouse to move a position of a cursor in an input text box. The given item may include an open-ended question that requests a free-form, non-multiple choice response from the user. The given item may include a prompt that requests that the user generate a constructed response that is a short answer (e.g., a single word or phrase not comprising a complete sentence), one or more complete sentences, and/or an essay (e.g., comprising multiple sentences and/or paragraphs). The given item may be used in assessing various attributes of the user (e.g., the user's reading comprehension, the user's understanding of a concept, the user's vocabulary knowledge, etc.). In examples, the user is a human that generates the constructed response 104.

The constructed response 104 is received at a computer-implemented assessment engine 102. Also received at the computer-implemented assessment engine 102 is an electronic process log 106 associated with the response 104. As referred to herein, an "electronic process log" comprises data indicative of writing processes utilized by the user in generating the constructed response 104. The electronic process log 106 may thus reflect the user's writing behavior, including planning, revising, and editing performed by the user in generating the constructed response 104, among other behavior. In an example, the electronic process log 106 comprises a plurality of time-stamped entries, with each of the entries (i) being associated with a keystroke made by the user in generating the constructed response 104, and (ii) indicating a change in the text of the constructed response 104 due to the keystroke. In this example, the electronic process log 106 is not merely a "keystroke log." Conventional keystroke logs only provide information on which key was pressed. By contrast, the electronic process log 106 utilized herein provides information on (i) which key was pressed, and (ii) how the text changed due to the keypress. In some embodiments, the electronic process logic 106 may further include data reflecting linguistic analyses of time-stamped actions. Features of the electronic process log 106 are described in further detail below.

The computer-implemented assessment engine 102 is configured to process the constructed response 104 and the electronic process log 106. In processing the constructed response 104, the assessment engine 102 is configured to generate first feature values representative of aspects of the constructed response 104. Such first feature values may correspond to features used in conventional automated scoring systems known to those of ordinary skill in the art. For instance, the first feature values may correspond to features utilized in the E-rater essay scoring system, which is the property of Educational Testing Service. The E-rater essay scoring system, described in U.S. Pat. Nos. 6,181,909 and 6,366,759 to Burstein et al., which are incorporated herein by reference in their entireties, utilizes features relating to (i) content of the constructed response, (ii) lexical complexity of the constructed response, (iii) grammar, usage, mechanics, and style errors of the constructed response, and (iv) organization of the constructed response, among others. It is noted that the first feature values generated by the computer-implemented assessment engine 102 may correspond to various other features utilized in automated scoring systems. The first feature values are representative of aspects of the final written product produced by the user (i.e., the submitted constructed response 104).

As noted above, the computer-implemented assessment engine 102 is further configured to process the electronic process log 106. In processing the electronic process log 106, the assessment engine 102 is configured to generate second feature values that are related to the user's actions in generating the constructed response 104. As described above, the process log 106 includes time-stamped data indicating behavior of the user (e.g., planning, editing, etc.) in generating the constructed response 104. Thus, the second feature values are indicative of the process utilized by the user in generating the constructed response 104, as opposed to the final written product produced by the user.

The second feature values derived from the electronic process log 106 are described in further detail herein and may indicate (i) a total time the user spent producing the constructed response, (ii) a typing speed of the user (e.g., a number of keystrokes divided by the total time), (iii) a time spent by the user on editing behaviors (e.g., time spent on cut/paste/jump events, normalized by total time), (iv) a rate of typo correction (e.g., log odds of correcting a spelling error versus leaving it uncorrected), (v) an amount of discarded text (e.g., proportion of events in the keystroke log that involve deletions rather than insertions), and (vi) a latency between words (e.g., median pause time before the first letter in a word), among other metrics. As referred to herein, a "feature" may be composed of a multiplicity of independent sub-features. For example, a feature described below is indicative of the user's keyboarding skill. Computing this feature may include determining from the electronic process log 106 various sub-features (e.g., intervals of time between the user's keystrokes in generating frequently-used words) and processing the sub-features.

In examples, the computer-implemented assessment engine 102 automatically generates a score 108 by applying a computer scoring model (e.g., a statistical computer model) to the first feature values (i.e., those feature values representative of aspects of the constructed response 104) and to the second feature values (i.e., those feature values related to the user's writing behavior in generating the constructed response 104). In these examples, because the computer model is applied to both the first and second feature values, the score 108 may be indicative of both the constructed response 104 and the user's writing processes in generating the constructed response 104. In other examples, the score 108 is not based on the second feature values. In these examples, the score 108 may be based on only the constructed response 104 and not on the user's writing processess in generating the constructed response 104. The computer scoring model may be part of an automated scoring system for automatically scoring the constructed response 104 without human intervention (or requiring only minimal human intervention). The computer scoring model is described in further detail below with reference to FIG. 2.

The computer-implemented assessment engine 102 also automatically generates information on the user's writing behavior 110 based on the second feature values. The information 110 may include a second score (e.g., a score that is different from the score 108) relating to one or more aspects of the user's writing processes and/or a piece of feedback. For example, the piece of feedback could be a text string stating, "The student takes time to plan his or her sentences and paragraphs and then produces text efficiently in longer bursts. These are characteristics of a stronger writer." The information on the user's writing behavior 110 is generated automatically based on the second feature values and without human intervention (or requiring only minimal human intervention). In examples, the information 110 may also be based on the first feature values (i.e., feature values derived from the constructed response 104). The information 110 may be used to provide a richer understanding of student performance that is not reflected in the score 108. For example, the user may receive a score 108 that is relatively low for a variety of reasons. The information 110 may provide an indication of why the student received the low score (e.g., the user has poor keyboarding skills, the user does not edit his or her work, etc.).

Conventionally, automated scoring systems assess constructed responses based only on the final written products produced by users. Thus, the conventional systems provide no information about planning, revision, editing, and other processes performed by users in generating the final written products. By contrast, the systems and methods described herein use process logs to gain a richer understanding of student performance and do not consider only the students' final written products. The approaches described herein enable the use of process logs (i) to provide richer validation information about assessments; (ii) to detect patterns of student responses that may be indicative of undesirable behaviors (e.g., lack of motivation, plagiarism, etc.) that may affect the validity and interpretation of scores; (iii) to support more accurate automated scoring; and (iv) to provide feedback to teachers, students, and other persons about writing performance, among other uses. It should thus be appreciated that the systems and methods described herein enable the providing of meaningful feedback that goes beyond a mere score for the final written product.

As described herein, features derived from an electronic process log may be combined with features relating to the final written product for various purposes. For instance, combining features used in conventional automated scoring systems with features extracted from an electronic process log can support identification of edits that did, or did not, improve a score for a constructed response. Similarly, the combination of features can support identification of words that the user had difficulty in spelling, even if the user spelled the word correctly in the final written product. The enhanced feedback enabled by the approaches described herein can be utilized in helping teachers identify specific kinds of support that students require (e.g., to increase students' ability to manage the demands of text production, to acquire more sophisticated revision and editing skills, etc.).

Figure 2:
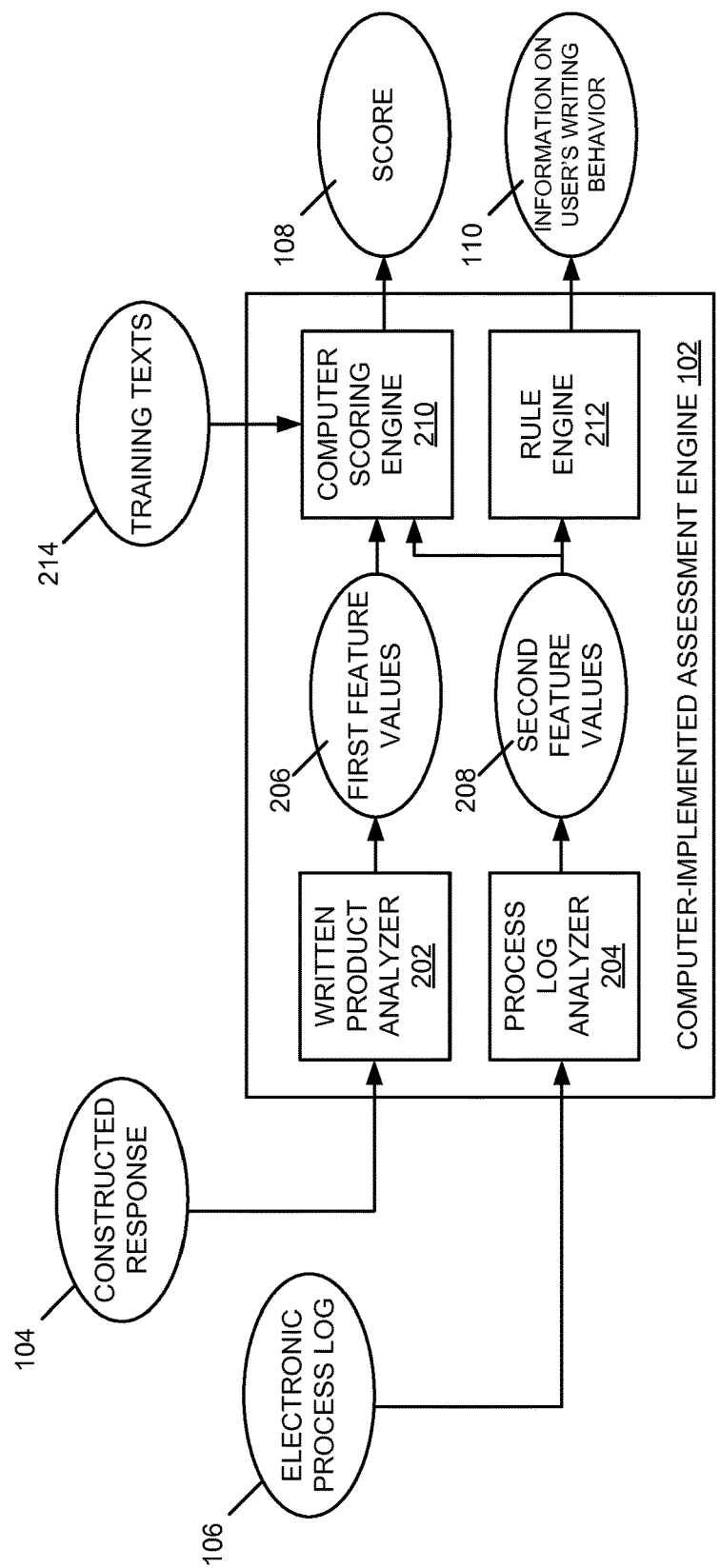
FIG. 2 is a block diagram including additional details on the computer-implemented assessment engine of FIG. 1.

FIG. 2 is a block diagram including additional details on the computer-implemented assessment engine 102 of FIG. 1. As shown in FIG. 2, the constructed response 104 is received at a written product analyzer 202. The written product analyzer 202 is configured to process the constructed response 104 to generate first feature values 206 representative of aspects of the constructed response 104. In an example, the first feature values 206 include numerical measures or Boolean values that are representative of aspects of the constructed response 104.

The written product analyzer 202 may perform various text processing on the constructed response 104. For instance, the written product analyzer 202 may employ a finite state machine to recognize linguistic boundaries (e.g., word, sentence, and paragraph) in the constructed response 104. The recognizing of these linguistic boundaries may be carried out using conventional automated, computer-based algorithms known to those of ordinary skill in the art. Various other processing and analysis may be performed on the constructed response 104 at the written product analyzer 202, such as correction of spelling errors in the constructed response 104, using conventional automated, computer-based algorithms known to those of ordinary skill in the art. The use of spelling correction algorithms can be beneficial to improve the quality of the assessment being carried out by reducing the likelihood of complications in the assessment caused by the presence of spelling errors.

The electronic process log 106 is received at a process log analyzer 204. The process log analyzer 204 is configured to process the electronic process 106 to generate second feature values 208 related to the user's actions (e.g., planning actions, editing actions, revising actions, etc.) in generating the constructed response 104. In an example, the second feature values 208 include numerical measures or Boolean values. The process log analyzer 204 may perform various processing of the electronic process log 106 and the feature values derived therefrom in generating the second feature values 208. As noted above, a "feature" may be composed of a multiplicity of independent sub-features. Thurs, in generating the second feature values 208, various high-level feature values may be extracted from the electronic process log 106 and processed to generate more complex feature values. Examples of such processing of high-level feature values are described below.

In the example of FIG. 2, the first feature values 206 and the second feature values 208 are received at a computer scoring engine 210. The computer scoring engine 210 includes an automated scoring system configured to determine the score 108 for the constructed response 104. The score 108 may measure various aspects of the constructed response 104 (e.g., a content of the response 104, a lexical complexity of the response 104, grammar, usage, mechanics, and style of the response 104, vocabulary utilized in the response 104, English language proficiency utilized in the response 104, etc.). The score 108 may be a point score (e.g., 87 points out of 110 points possible), a percentage or decimal score (e.g., 95% correct), a classification (e.g., "high," "medium," "low," etc.), or a ranking, for example. In an example, the computer scoring engine 210 is a computer-based system for automatically scoring the constructed response 104 that requires no human intervention or minimal human intervention. The scoring engine 210 may determine the score 108 for the constructed response 104 based on the first and second feature values 206, 208 and a scoring model (e.g., a statistical computer scoring model). In examples, the scoring model includes weighting factors for the feature values 206, 208, and the weighting factors are determined based on a plurality of human-scored constructed responses 214. Such human-scored constructed responses 214 may be referred to herein as "training texts." The scoring model may utilize a scoring equation. It is noted that in some examples, weighting factors of the scoring model are judgmentally determined and in a manner which is not necessarily statistical.

The scoring model may be a numerical model that is applied to the first and second feature values 206, 208 to determine the score 108. In an example, the scoring model comprises variables and associated weighting factors, with each of the variables receiving a feature value of the first and second feature values 206, 208. By applying the scoring model to the first and second feature values 206, 208 in this manner, the score 108 is determined.

To generate the scoring model used in the computer scoring engine 210, the engine 210 may receive the plurality of human-scored constructed responses 214 with associated scores for each of the constructed responses 214. The engine 210 or a model generation module included therein uses the plurality of human-scored constructed responses 214 to determine the weighting factors for the model, e.g., through a regression analysis. The plurality of human-scored constructed responses 214 may span a range of reference scores, and the constructed responses 214 may be scored constructed responses that have been accepted as usable for training the scoring model. In an example, the weighting factors of the model may be determined via a machine learning application trained based on the plurality of human-scored constructed responses 214. Specifically, the machine learning application may utilize a linear regression analysis, a logistic regression analysis, or another type of algorithm or analysis (e.g., a random forest learning analysis, decision tree analysis, random tree analysis, Classification And Regression Tree (CART) analysis, etc.).

With the scoring model in place, the score 108 may be determined by applying the scoring model to the first and second feature values 206, 208, as noted above. It should be appreciated that under the approaches described herein, one or more computer-based models are used in determining the score 108. As described above, such computer-based models may be trained via a machine-learning application in order to determine weighting factors for the models. By contrast, conventional human scoring techniques for determining a score for a constructed response include none of these steps. Conventional human scoring techniques involve one or more human graders reviewing constructed responses and manually assigning scores to the constructed responses.

The second feature values 208, in addition to being received at the computer scoring engine 210 in the example of FIG. 2, are received at a rule engine 212. In an example, the rule engine 212 includes multiple rules that each include (i) a condition, and (ii) an associated action. The rule engine 212 applies the conditions to the second feature values 208 and determines one or more rules of the multiple rules that are satisfied. A rule of the rule engine 212 is satisfied when one or more feature values of the second feature values 208 meet a condition associated with the rule. The rule engine 212 performs an action associated with the satisfied rule to generate the information on the user's writing behavior 110. As noted above, the information 110 may include (i) a score relating to one or more aspects of the user's writing processes or behaviors, and/or (ii) a piece of feedback. Thus, the performing of the action associated with the satisfied rule may include calculating a score (e.g., a second score that is different from the score 108) based on the one or more feature values that meet the satisfied rule's condition or returning feedback including a predetermined response, among other actions. In an example, the predetermined response includes a fixed text string or a template with variables that are filled based on the one or more feature values that meet the satisfied rule's condition.

The example of FIG. 2 depicts the rule engine 212 receiving only the second feature values 208 from the process log analyzer 204. In other examples, the rule engine 212 also receives the first feature values 206 from the written product analyzer 202. In these other examples, the rule engine 212 applies the conditions of its rules to both the first and second feature values 206, 208 to determine one or more rules that are satisfied. An action or actions are performed based on the one or more satisfied rules to generate the information on the user's writing behavior 110. Thus, under the approaches described herein, the information 110 is generated by applying the computer-based rule engine 212 to the second feature values 208 or to both of the first and second feature values 206, 208. The rule engine 212 includes multiple (e.g., tens, hundreds, thousands, etc.) rules, with each of the rules including a condition and an associated action. By contrast, conventional human techniques for providing information on a user's writing behavior do not utilize such computer-based rule engines. The conventional human techniques include one or more humans monitoring students as they perform a test and manually providing feedback on the student's writing behavior. Also, the conventional human techniques would not include use of the above-described electronic process logs. The use of the electronic process logs permits every student interaction with a keyboard (e.g., every keystroke and the effect of that keystroke on the constructed response) to be recorded with a precise timestamp and analyzed. A human who manually monitors students could not detect and make note of every such student interaction with a keyboard, nor could the human precisely record timestamps of each interaction. Additional distinctions between the approaches described herein and conventional human techniques are described throughout this disclosure. The approaches described herein are rooted in computer technology and are vastly different than conventional human techniques, as noted above. Accordingly, it is evident that the approaches described herein are not mere computer implementation of conventional human techniques and indeed are vastly different from such.

FIG. 3 depicts example entries 302-310 of an electronic process log. In examples, the electronic process log includes a plurality of time-stamped entries, where each of the entries is associated with a keystroke made by a user in generating a constructed response and indicates a change in text of the constructed response due to the keystroke. In an example, each entry of the process log includes (i) first data indicating a position in the text where the change occurred, (ii) second data indicating one or more characters removed from the text due to the keystroke, the second data being null when no characters are removed due to the keystroke, (iii) third data indicating one or more characters added to the text due to the keystroke, the third data being null when no characters are added due to the keystroke, and (iv) fourth data indicating a timestamp associated with the keystroke.

To illustrate example data of the electronic process log, reference is made to entry 302 of FIG. 3. The entry 302 is associated with a keystroke made by a user, where the keystroke is used to type the letter "M" into an empty text box (i.e., the keystroke is the first keystroke used in generating a constructed response). In the entry 302, the variable "p" holds the position in the text where the change occurred, which is equal to "0" in this example (e.g., the letter "M" was typed at the very beginning of the text box). The variable "o" holds the one or more characters that were removed from the text due to the keystroke. Because the typing of the letter "M" did not cause any characters to be removed, the variable "o" is null in the entry 302. Keystrokes that may cause text to be removed include backspaces, keystrokes that cause text to be cut, keystrokes that result in text being typed in over other text, and keystrokes that result in text being pasted over other text, among others. The variable "n" holds the one or more characters added to the text due to the keystroke, which is equal to "M" in this example. The variable "t" indicates the timestamp (e.g., in seconds) associated with the keystroke and holds the value "0.00" in the entry 302. In the example of FIG. 3, the variable "t" is a time measured from the beginning of the first keystroke used in generating the constructed response.

In the example of FIG. 3, after typing the letter "M," the user may subsequently type the letters "a" and "t" at times t=0.25 and t=0.50, respectively. The typing of the letter "a" would result in the entry 304 of the log, and the typing of the letter "t" would result in the entry 306 of the log. For each of these entries 304, 306, no text is removed due to the keystrokes, and thus, the variable "o" is null for each entry. Subsequently deleting the letter "t" would result in the entry 308. Deleting the letter "t" did not result in characters being added to the text, and thus, the variable "n" is null for the entry 308. Subsequently adding the two letters "te" together (e.g., by pasting in text) to the end of the text would result in the entry 310.

Figure 4:
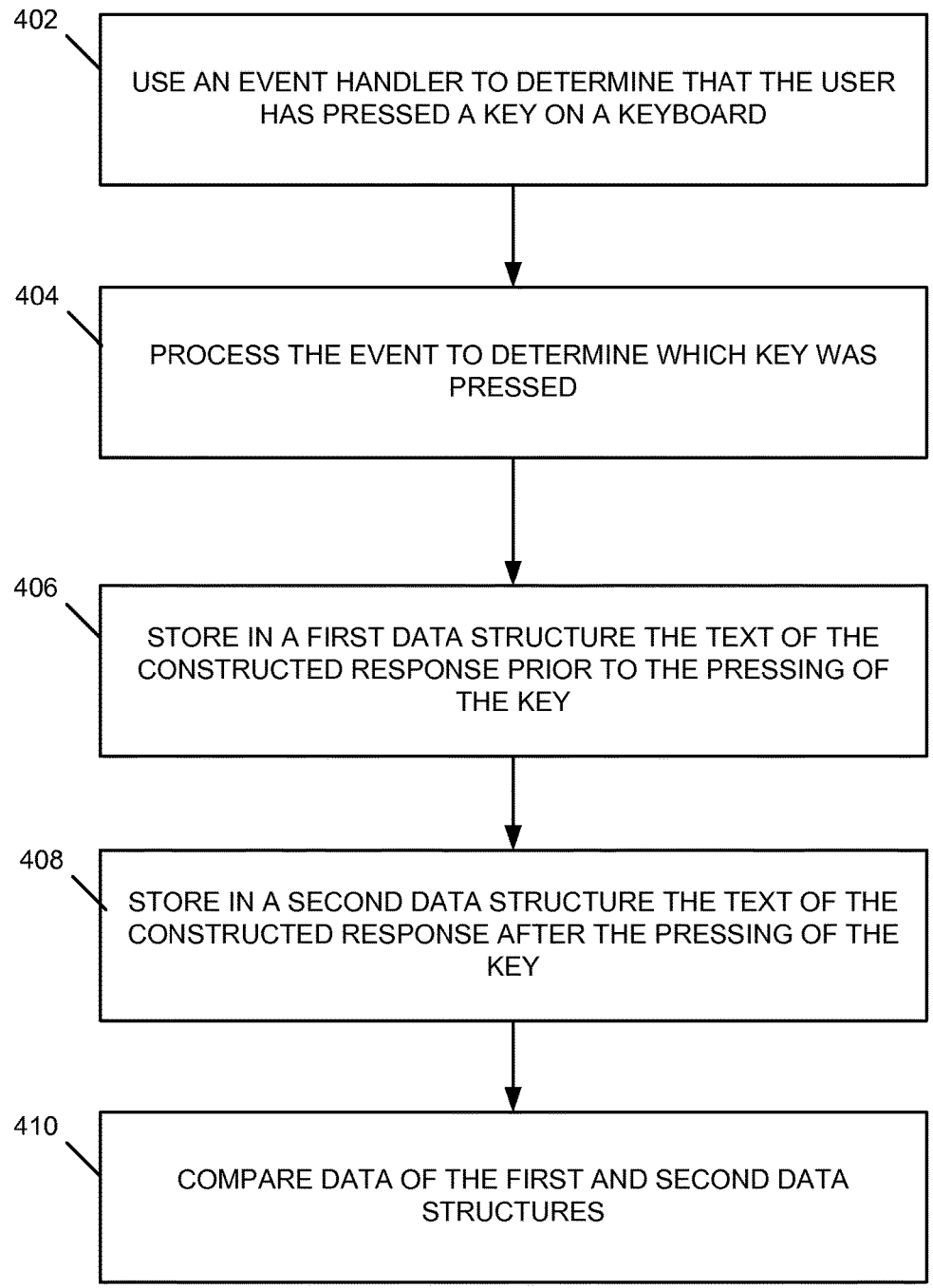
FIG. 4 is a flow diagram depicting example steps for generating an electronic process log.

FIG. 4 is a flow diagram depicting example steps for generating an electronic process log. In examples, a user generates a constructed response as part of a computer-based assessment. The computer-based assessment may deliver an item (e.g., a question, a task) that elicits the constructed response via a web browser and may require that the user type the constructed response into a text box (e.g., text field or text entry box) presented by the web browser. Thus, systems and methods described herein support the collection of information for process logs from web browsers. In an example, the data collection leverages the browser technologies HTML and JavaScript. An HTML TEXTAREA input is instrumented with JavaScript event handlers to capture each time the user types in a key. Thus, as indicated at 402 of FIG. 4, an event handler is used to determine that the user has pressed a key on a keyboard. The event handler may generate an event (e.g., an event "onkeyup" for the Internet Explorer web browser, and an event "onkeypress" for the other browsers) based on the pressing of the key.

At 404, the event is processed. The processing of the event may be used to determine, among other information, which key was pressed. In examples, when the key press event is fired, Javascript's "setTimeout" method is used to call the event processing function after a delay (e.g., a 1 millisecond delay). The delay is used to process the event on another thread so that the user who is typing does not experience any lag. As described above, the electronic process logs used herein may not be mere keystroke logs. Conventional keystroke logs only provide information on which key was pressed, while the electronic process logs utilized herein may also provide information on how the text changed due to the keypress. Determining how the text changed due to the keypress presents challenges, for example, in scenarios where a simple knowledge of which key was pressed does not provide all necessary information (e.g., pasting previously cut text through a keyboard shortcut such as "Ctrl+V," deleting a highlighted chunk of text using the delete key, etc.).

In light of these challenges, in some examples, previously processed text saved by the system is compared with new text that is in the input control. The comparison between the "old" text and the "new" text may be performed as follows. First, arrays are constructed from the characters of the new and old text, and then compared to each other from the first position until they no longer match to determine the start position of the changed text. The arrays are then reversed and compared from the end to determine the end position of the changed text. Once the area where the text changed is identified, the old and new text is recorded into a log along with the position of the text change and a timestamp. These steps are reflected at 406, 408, and 410 of FIG. 4. At 406, the text of the constructed response prior to the pressing of the key is stored in a first data structure. At 408, the text of the constructed response after the pressing of the key is stored in a second data structure. At 410, data of the first and second data structures are compared to determine the change in the text of the constructed response due to the pressing of the key.

In examples, the logic for generating the electronic process log may be simplified to exclude the comparison of the new and old text in cases where characters were only added or removed. In addition, in some examples, some noise characters are stripped out, namely carriage return/newline characters (e.g., to handle differences between different web browsers) and then re-added after the comparison between the new and old text is completed. As noted above, the data for the process log may be captured via a web browser. This data may be sent to a server (e.g., a server maintained by a testing service and configured to store electronic process logs associated with constructed responses) either at regular checkpoints or when the user takes an action to submit text or leave the web page displayed by the web browser.

JavaScript code implementing the procedure described above for generating an electronic process log may include the following:

```
setTimeout("doDiff('" + src.id + "')", 1);
function doDiff(srcID) {
    var dataObj = getRecordedDataObj(srcID);
    var news = document.getElementById(srcID).value.replace
(/(\r\n|\r|\n)/gm, '\n');
    var olds = dataObj.olds.replace(/(\r\n|\r|\n)/gm, '\n');
    if (news != olds) {
```

-continued

```
        var t2 = new Date( );
        var dt = (t2 – dataObj.t1) / 1000;
        var oldc = olds.split("");
        var newc = news.split("") ;
        for (i = 0; i < Math.min(newc.length, oldc.length) ; i++) {
    if (newc[i] != oldc[i])
            break;
    }
    newc = newc.reverse( );
    oldc = oldc.reverse( );
    for (j = 0; j < Math.min(newc.length, oldc.length) – i; j++) {
            if (newc[j] != oldc[j])
                break;
    }
    var sliceold = olds.slice(i, olds.length – j);
    var slicenew = news.slice(i, news.length – j);
    dataObj.olds = news.replace(/(\r\n|\r|\n)/gm, '\n');
    dataObj.editAry.push({ p: i, o: sliceold.toString( ), n:
    slicenew.toString( ), t: dt.toFixed(2) });
            }
        }
        function getRecordedDataObj (srcID) {
            if ( !recordedData[srcID]) {
                recordedData[srcID] = new Object( );
                recordedData[srcID].t1 = new Date( );
                recordedData[srcID].editAry = new Array( );
                recordedData[srcID].olds = "";
            }
            return recordedData[srcID];
        }
```

After the electronic process log has been collected, a process may be used to reconstruct the buffer from the sequence of log entries by applying the changes identified in each entry to the buffer resulting from processing the preceding entries. The resulting output enables examination of the context for any change in the context of the buffer at the point at which the change occurred. Modifications may be made in examples. For example, in some embodiments, the entire buffer is not saved with each keystroke, and instead, only the difference caused by the keystroke is saved in order to minimize the amount of data saved to the server. The sequence of buffers associated with each keystroke can subsequently be reconstructed from the log file. In some examples, the event processing function is called on a different thread after a 1 millisecond delay to avoid lagging the web browser. Additionally, in some examples, normalizations are applied to the process log to account for differences among web browsers.

Figure 5:
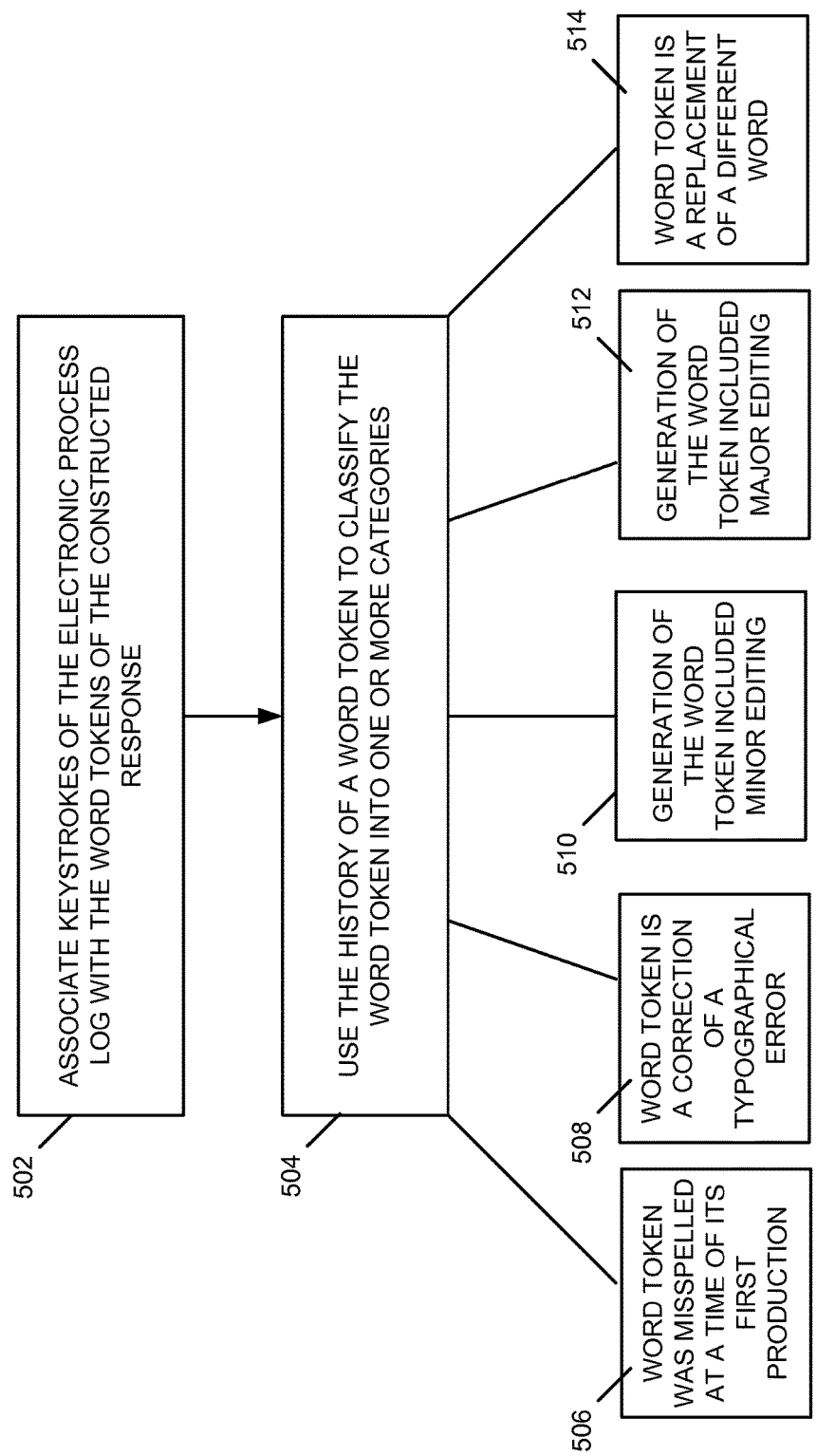
FIGS. 5-7 depict flow diagrams for generating example feature values from an electronic process log.

In the approaches described herein, the electronic process log is processed with a computer processing system to generate feature values related to a user's actions in generating a constructed response. The generation of certain of these feature values is described below with reference to FIGS. 5-8. FIG. 5 depicts example steps for generating feature values related to the user's production of individual word tokens of a constructed response. The constructed response comprises a plurality of word tokens, and in examples, a finite state machine is used to recognize word boundaries to determine the word tokens present in the constructed response. The finite state machine may also be used to recognize the identities of the word tokens (e.g., what word a token represents). At 502, keystrokes of the electronic process log are associated with the word tokens of the constructed response to create a history for each word token. The associating of keystrokes with word tokens may exploit information provided by the reconstructed text buffer in combination with data of the electronic process log.

In associating the keystrokes with word tokens at 502, if a possible word is not being processed or after a jump in position in the text, the following steps may be performed: (i) find the position in the reconstructed text buffer indicated by the keystroke log event record; (ii) search left and right in the buffer for whitespace or punctuation marks; (iii) identify the alphanumeric sequence between whitespace or punctuation marks as a possible word; (iv) associate this sequence with the keystroke as the current possible word at the point the keystroke was produced; and (v) process the current keystroke as a new event with the current possible word.

In associating the keystrokes with word tokens at 502, if a possible word is being processed, the following conditions may be used: (i) if text is inserted and not deleted, and does not contain whitespace or punctuation, extend the current token, and associate all keystroke events that have contributed to the current token with the result of updating the token to include inserted characters; (ii) if inserted text contains whitespace or punctuation, or whitespace or punctuation are deleted, start a new token based on the reconstructed buffer after the keystroke event is processed; and (iii) if multiple keystrokes are recorded as a single event due to delays in processing events, only associate added text with the current token if it falls into the same token in the reconstructed buffer after the keystroke event is processed.

The location of tokens can be changed by insertion and deletion events prior to the end of the text buffer changes the location of tokens. Therefore, the actual offsets of tokens are updated after the buffer is updated to reflect shifts in position associated with insertions or deletions. Changes to a token that take place after a jump to another part of the buffer are associated with previously identified tokens using the updated offsets. Modifications to the step 502 for associating keystrokes of the electronic process log with tokens of the constructed response may be utilized in examples. For example, larger grain summarization of events beyond single keystrokes may be used in some examples. Also, automated identification of specific final tokens associated with a set of keystroke events may be utilized in some examples, where such final tokens may not be contiguous in the electronic process log.

At the completion of the step 502, a history has been created for each word token. From the history of a word token, it is possible to extract partial tokens, where such partial tokens may be seen as events in the history of the word token. For instance, if the word token "class" is produced with no deletions or cursor moves, it may include the partial tokens "c," "cl," "cla," "clas," and "class." On the other hand, with editing events involved, there might be changes that reflect typos or spelling errors. For example, the word token "perfect" may include the partial tokens "p," "pe," "per," "perg," "per," "perf," "perfe," "perfec," and "perfect." In this case, there has been a typo ("perg"), followed by deletion of the offending character and retyping of the intended character, leading to successful completion of the whole word. Deletion or backspacing events can lead in the extreme case to the deletion of an entire word and its replacement by entirely unrelated text.

As shown at 504 in FIG. 5, the history of a word token is used to classify the word token into one or more categories. The one or more categories include a first category 506 indicating that the word token was misspelled at a time of its first production, a second category 508 indicating that the word token is a correction of a typographical error, a third category 510 indicating that the generation of the word token included minor editing, a fourth category 512 indicating that the generation of the word token included major editing, and a fifth category 514 indicating that the word token is a replacement of a different word.

In an example process for classifying the word token based on features of its history, for each partial token, the partial token is identified as being (a) a possible word, (b) a possible word prefix, or (c) out of vocabulary (e.g., anything else, including a misspelling) based upon a spelling dictionary. If the last partial token before a delimiting character is inserted is out of vocabulary, the token is classified in the first category 506 (e.g., misspelled at the time of first production). If a partial token is out of vocabulary, but the last partial token before a delimiting character insertion is correctly spelled, then the word token is classified in the second category 508 (e.g., as a corrected typo). If the partial token sequence involves deletions as well as insertions, but all partial tokens are possible words or word prefixes, the token is classified as being in the third category 510 (e.g., word token involves minor editing) if only a few characters are different, and the token is classified as being in the fourth category 512 (e.g., word token involves major editing) for edits involving more than a few changes. If so much editing has taken place that the entire word has been replaced by a different word, the word token is classified in the fifth category 512 (e.g., sequence instantiates a word choice event rather than editing). In examples, the process of FIG. 5 utilizes information about valid spelling to support inferences about whether the writer was successfully monitoring spelling.

As noted above, FIG. 5 depicts example steps for generating feature values related to the user's production of individual word tokens. In an example, the feature values are generated based on the classifications of the word tokens into the one or more categories. For example, the feature values may include a first feature value that is a total number of word tokens classified into the first category, a second feature value that is a total number of word tokens classified into the second category, and so on. It should be appreciated that these feature values are examples only and that other feature values may be generated based on the classifications of the word tokens into the categories (e.g., a proportion of the total number of word tokens that are classified into the first category, etc.).

Figure 6:
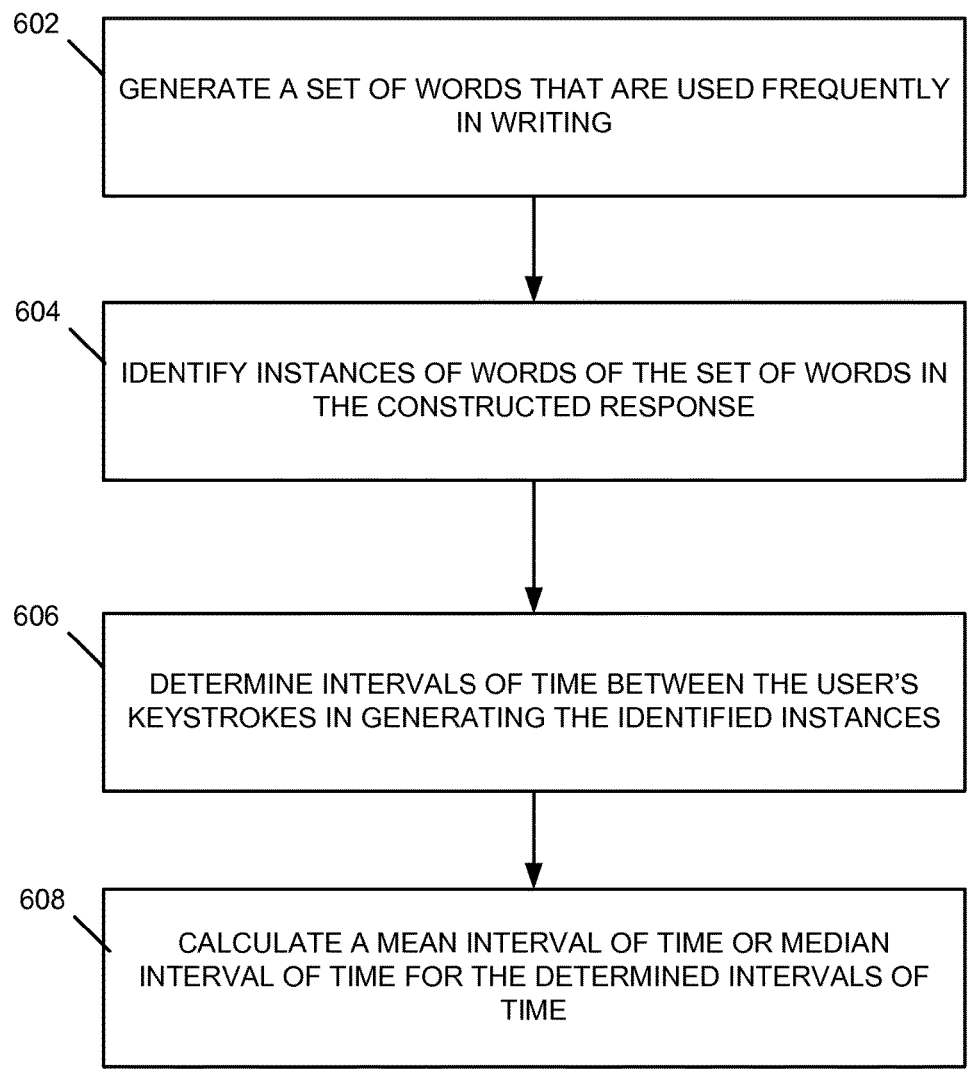

FIG. 6 depicts example steps for generating feature values that are indicative of a keyboarding skill of a user. The electronic process logs described herein directly measure the latency between keystroke events. Such logs reflect different aspects of writing skill, including general writing skill, word-finding, spelling-correction, and the ability to use a keyboard efficiently. The ability to use a keyboard efficiently is more of a motor skill, in contrast to the other listed skills that are related more to cognition. In examples, a burst of text production is defined based on a threshold length. For example, a burst may be defined as a sequence of characters produced with no pause between characters that is longer than 2 seconds. A user's ability to produce such bursts may be related to his keyboarding skill, as discussed below. Depending on the speed of typing, very different patterns may result for people with the same general levels of writing skill, and thus, it is desirable to separate keyboarding fluency from other aspects of writing.

The systems and methods described herein utilize different methods of generating feature values that are indicative of a keyboarding skill of the user. The flowchart of FIG. 6 depicts one such method that is based on intervals of time between keystrokes of frequently-typed words. At 602, a small set of frequently-typed words, such as "the," "that," "or," and "and," are selected. These words may be selected either on the basis of frequency, as used in the user's constructed response, or through the manual creation of a stop word list. At 604, instances of words of the set of frequently-typed words are identified in the constructed response. At 606, the electronic process log associated with the constructed response is processed to determine intervals of time between the user's keystrokes in generating the identified instances.

At 608, the median interval of time or mean interval of time for the determined intervals of time is calculated. Since the words of the set are used frequently, their spelling will be fully automatized for people with experience in producing text by keyboard, and the intervals of time between keystrokes should primarily reflect the underlying speed of motor planning and execution. The median interval of time or the mean interval of time may be used as a feature value that is indicative of the user's keyboarding skill. In other examples, the vocabulary of the constructed response is stratified by frequency bands, and the mean or median inter-key interval for the words in each of the bands is calculated based on the process log. These other examples may provide more information on how keystroke speed changes with less familiar or longer words.

Another method for generating feature values that are indicative of a keyboarding skill of a user is based on burst length relative to an inter-key interval (e.g., a mean or median inter-key interval) for the user. In this method, an inter-key interval is calculated. The inter-key interval may be, for example, a mean or median amount of time between keystrokes used in generating a constructed response. A threshold pause length is defined (e.g., four times longer than the median inter-key interval for the user) that is likely to exclude all events that involve pure typing with no other cognitive processes intruding. Bursts are defined as sequences of word tokens in which none of the inter-token pauses are longer than the threshold pause length. In examples, long pauses that happen in the middle of a word are not treated as ending a burst. The number of bursts used in generating the constructed response may be used as a feature value that is indicative of the user's keyboarding skill.

Another method for generating feature values that are indicative of a keyboarding skill of a user applies frequency domain methods to distinguish keyboarding from other kinds of writing processes. The writing style of each user may be characterized by periodic patterns of keystrokes. For example, some users may repeatedly type certain words/phrases with similar inter-key intervals. This kind of recurrent/periodic pattern can be identified using a frequency domain analysis (e.g., a Fourier analysis for transferring a time domain series to the frequency domain). The power spectrum of the process log may be analyzed to identify periodic patterns in the log. The location of the peaks and the strength of the peaks in the power spectrum may comprise feature values indicative of the user's keyboarding skill.

Figure 7:
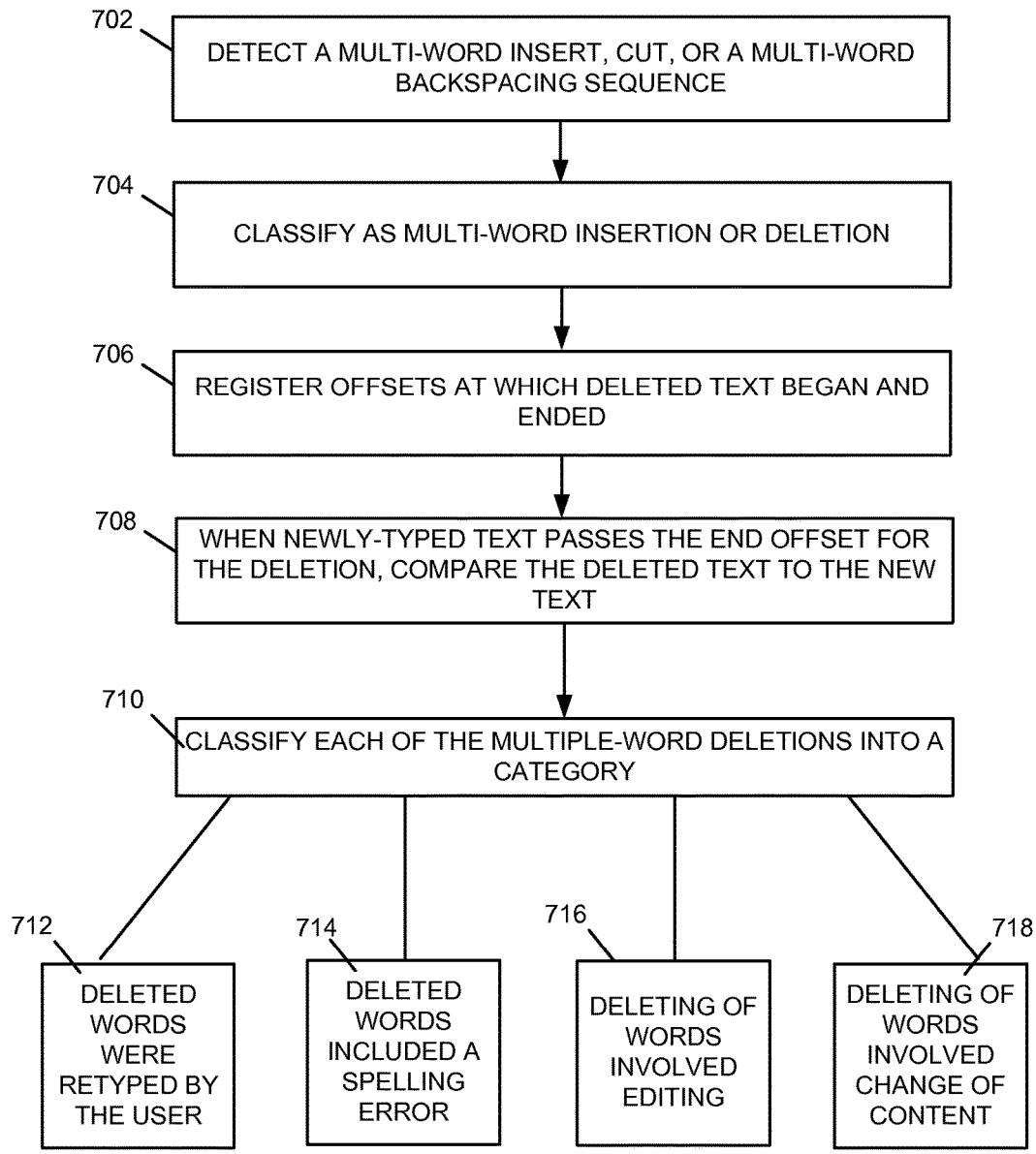

FIG. 7 depicts example steps for generating feature values relating to a writer's use of multiple word deletions. When a large stretch of text is deleted (e.g., 2 or more words) this may have happened for different reasons. The writer may have detected a spelling error, backspaced to the error, corrected the error, and retyped the words that were deleted in the backspacing. Alternatively, the writer may have been feeling hesitant and may have written the same chunk of text twice. Or the writer may have been feeling uncertain about the exact phrasing to be used and may have been trying to tweak the phrasing. Or the writer may have completely changed his or her mind about what should come next in the text. The method of FIG. 7 may be used to disambiguate these actions.

At 702, a multi-word insert, cut, or multi-word backspacing sequence is detected. At 704, the detected event is classified appropriately as a multi-word insertion or deletion. At 706, the offsets at which deleted text began and ended are registered. At 708, when newly typed text passes the end offset for the deletion, the deleted text is compared to the new text. At 710, each of the deleted multi-word sequences is classified. If the newly typed text is identical to the deleted text, the multiple word deletion is classified at 712 as involving retyping. If the newly typed text is identical to the deleted text except for spelling corrections, the multiple word deletion is classified at 714 as involving a spelling correction sequence. If there is a large overlap between the n-gram sequences in the new and deleted text, the multiple word deletion is classified at 716 as involving editing. Otherwise, the multiple word deletion is classified at 718 as involving a change in content.

As noted above, FIG. 7 depicts example steps for generating feature values relating to a writer's use of multiple word deletions. In an example, the feature values are generated based on the classifications of the multiple word deletions into the categories described above. For example, the feature values may include a first feature value that is a total number of multiple word deletions classified into a first category of the categories above, a second feature value that is a total number of multiple word deletions classified into the second category of the categories above, and so on. It should be appreciated that these feature values are examples only and that other feature values may be generated based on the classifications of the multiple word deletions (e.g. a proportion of the total number of multiple word deletions that are classified into the first category, etc.). In examples, the method of FIG. 7 may include comparing before-and-after snapshots of multi-word sequences in a process log and using the comparison to infer what kind of editing process is indicated.

In examples, the electronic process log is analyzed to identify contextual differences in pause types. Attributes of keystroke events can be determined using a finite state machine and a classification in terms of major linguistic boundaries (e.g., between words, between sentences, between paragraphs). Systems and methods as described herein may utilize a method that takes advantage of the analysis of word tokens, which provides for a segmentation of the electronic process log into word-token internal and inter-word character sequences. In an example of this method, inter-word tokens are classified into the following categories: word delimiting sequences containing only whitespace, sentence-internal punctuation sequences, end-of-sentence punctuation sequences, and line- or paragraph-ending character sequences (e.g., typically involving newlines and accompanying whitespace), and other whitespace. Word tokens are classified contextually by their position in a burst (e.g., as defined above, such as burst-initial, burst-internal, burst-final). One word bursts may be treated as a special case, since they combine burst-initial and burst-final in a way that makes the usual interpretation of either suspect. Word tokens are classified contextually as internal or as being before or after in-sentence punctuation, end-of-sentence punctuation, and line- or paragraph-breaks. The resulting classifications are treated as distinct events in the electronic process log, distinguishing the time durations in them from the durations that appear in stretches of text without one of the above boundary conditions. In some examples, the kinds of boundaries recognized may be enhanced to include burst boundaries of the kind defined above plus in-sentence punctuation. Additionally, categories for word tokens adjacent to a boundary may be created.

In examples, the electronic process log is analyzed to generate feature values relating to jumps (i.e., text position changes during the user's generation of the constructed response). It is noted that jump actions may be facilitated by the user's use of a mouse (e.g., to move a position of a cursor) or another input device that is different from a keyboard. Processes utilized herein may define jump events and record whether changes to the text occurred at the end of the text or text-internally. Jumps may reflect different kinds of cognitive processes depending on their length and context, and thus, information relating to jumps may provide informative feature values. In an example, jumps are classified as being (i) jumps that land in the same word token as the previous change, or (ii) jumps that land in a different token. A classification (e.g., a binary classification) may be output that identifies jumps as being word-internal or not. The position variable may be treated as end-of-text not only if the character changed is the very last one in the text but also if all that follows the changed character is whitespace. Keystroke events that are adjacent to a jump may be classified as being pre- or post-jump, and the length of the jump in characters may be recorded as a feature value. In examples, features capturing n-gram statistics (e.g., including pointwise mutual information, mutual rank ratios, and multiword expressions) are extracted from an electronic process log as words are produced.

FIGS. 8A-8M are tables depicting example features utilized in the systems and methods described herein. It is noted that other features not included in these tables may be used in the systems and methods described herein. Summary features included in the tables may include various totals (e.g., total time on task, total number of characters, etc.). The summary features may utilize various keystroke event categories (e.g., keystrokes that take place within a word, between words, between sentences, between paragraphs; keystrokes that involve one or more backspaces; keystrokes that involve cut/paste/jump events; burst events defined by a fixed-duration pause length threshold). Over these event categories, various summary features may be defined, including total number of events in a specified category, mean and standard deviation of durations of time for events of the specified category, and total duration of time for events of the specified category (e.g., normalized against total time). These summary features may be associated with individual responses. It is noted that other features described herein are associated with individual word tokens or with sequences of word tokens. Summary features used herein may further include features for categories including total number and proportion of keystrokes assigned to the different categories, total number and proportion of time spent performing events of the different categories, and median durations of time spent performing events of the different categories, among others. In examples, features reflecting medians and proportions are used rather than features reflecting mean and standard deviation of log values, as the features reflecting medians and proportions may function as more stable central tendencies.

The tables of FIGS. 8A-8M describe additional features utilized in the systems and methods described herein. The features are described in an XML document type definition. The tables include XML doctype declarations and explanations for each of the declarations. KEYLOGEVENT attributes (beginning on FIG. 8B) are attributes or features for individual keystrokes. KEYBOARDINGBLOCK attributes (beginning on FIG. 8C) are attributes or features for a "keyboardingblock," which is a sequence of keystrokes that adds up to a meaningful event (e.g., a word produced, a sequence of words deleted or inserted, a delimiter such as spaces or punctuation, etc.). RESPONSE attributes (beginning on FIG. 8F) are attributes or features associated with an entire constructed response.

As described above with reference to FIG. 2, a computer-based scoring engine may determine a score based on features derived from both (i) a constructed response (i.e., the final written product), and (ii) an electronic process log. The features used in scoring may thus include one or more of the process-related features described above (e.g., those included in the tables of FIGS. 8A-8M, etc.), along with various features used in automated scoring systems. Additionally, in examples, one or more state probability features are used in the scoring. Example state probability features may be based on (i) a probability of the user making a cursor jump inside the document while in a burst, and (ii) a probability of the user inserting several characters after a long pause, among others. In some examples, one or more state-transitional probability features are used in the scoring. An example state-transitional probability feature is based on a probability that the user in their writing process changes from one state to another.

In examples, the computer-based scoring engine uses a statistical computer scoring model that includes weighting factors for the feature values it receives, with the weighting factors being based on a plurality of human-scored training texts. In an example, three categories of features are used: (i) certain of the features described above with reference to FIGS. 5-8M, (ii) one or more state probability features, and (iii) one or more state-transitional probability features. To determine the weighting factors of the statistical computer scoring model, a hierarchical linear regression is used in an example, with the human score of the training texts being the dependent variable, and with the three categories of features being entered in steps, retaining significant features in each step. As noted above, other types of analysis may be used in determining the weighting factors of the statistical computer scoring model (e.g., logistic regression, random forest learning algorithm, etc.).

Figure 9:
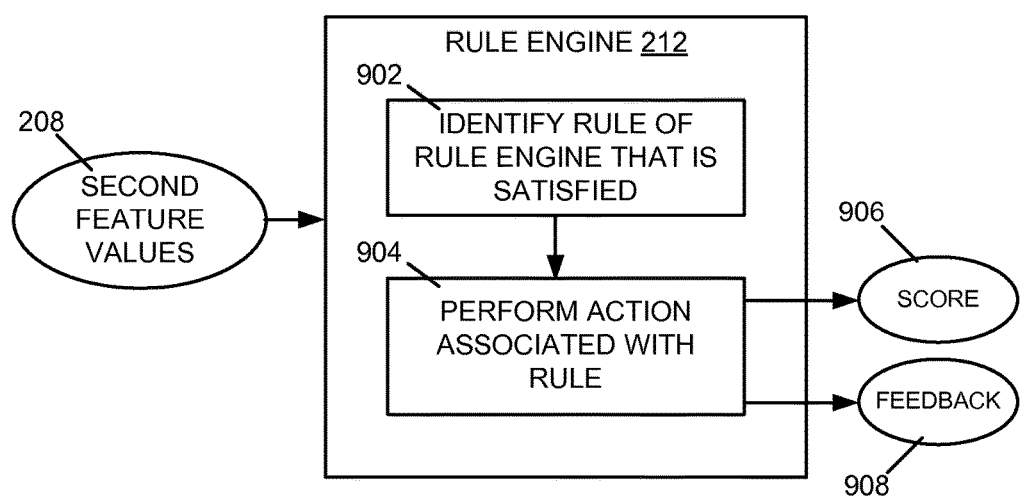
FIG. 9 depicts a rule engine and example steps that may be performed by the rule engine.

FIG. 9 depicts the rule engine 212 of FIG. 2 and example steps that may be performed by the rule engine 212. As described above, second feature values 208 derived from an electronic process log are received at the rule engine 212. In some examples, the rule engine 212 also receives first feature values 206 derived from the constructed response (i.e., the final written product). The rule engine 212 takes the constellation of received feature values (i.e., second feature values or a combination of first and second feature values) and applies a series of condition/action pairs specified in a rulebase. Rules in the rulebase are triggered when feature values for a response match a condition defined in the rulebase. Thus, at 902, a rule of the rulebase that is satisfied is determined. At 904, one or more actions associated with the satisfied rule are performed. The actions may include calculating a score 906 as a combination of feature values or returning feedback 908 in the form of a prestored response. Prestored responses can be fixed strings or they can be templates which include variables conditionally filled depending on the value of a feature or an expression derived from a set of features.

The feedback 908 provided by the rule engine 212 may relate to behavioral patterns of users' writing processes. For example, more capable writers (e.g., as evidenced by higher human scores on text production quality) may spend more time on producing more texts in longer bursts, revise and replace previous texts with different content (e.g., in contrast to the same content), and show more deliberation about word choice. Thus, the feedback 908 may highlight such actions performed by the user and note that they are actions performed by more capable writers. Less capable writers may show more hesitancy (or disfluency) during writing. Less capable writers may pause longer before starting to write, pause longer at beginnings of the words and at white space, pause longer inside words, and produce letters at a relatively low rate. The feedback 908 may highlight such actions performed by the user and note that they are actions performed by less capable writers. The feedback 908 may relate to categories of behavioral patterns such as (a) latency and typing fluency, (b) phrasal and chunk level text deletion and editing, (c) word-level editing involving monitoring the typing as text being produced (e.g., not just proofreading), and (d) planning and deliberation at the sentence level, and above.

In examples, the systems and methods described herein utilize an input processor that takes written input and associates it with an electronic process log and a final text buffer. The input processor may be implemented using a computer processing system, in examples. A user interface may be used to accept text input from users and display scores and feedback. In some examples, the input processor allows for multiple sessions of writing input for a single response, and information about gaps between sessions can be included in the electronic process log. The input processor may also allow for multiple attempts (e.g., input followed by a request for score or feedback) within a session, with feedback displayed by the user interface. In examples, the input processor is associated with a specific prompt, and different rulebases may be activated to process responses to different prompts. A written product analyzer used in the approaches described herein (e.g., the written product analyzer 202 of FIG. 2) may extract features values that may be used to detect the similarity of student responses to stimulus texts associated with a prompt. These feature values may be used to calculate scores or provide feedback. In examples, the rule engine 212 is a production rule system in which rules are tested sequentially and the engine 212 stops testing conditions after one rule is triggered. The rulebase may include rules that create different feedback and score information for different classes of users, such as teachers and students. Further, the user interface may display feedback and score information differently for different classes of users.

Figure 10:
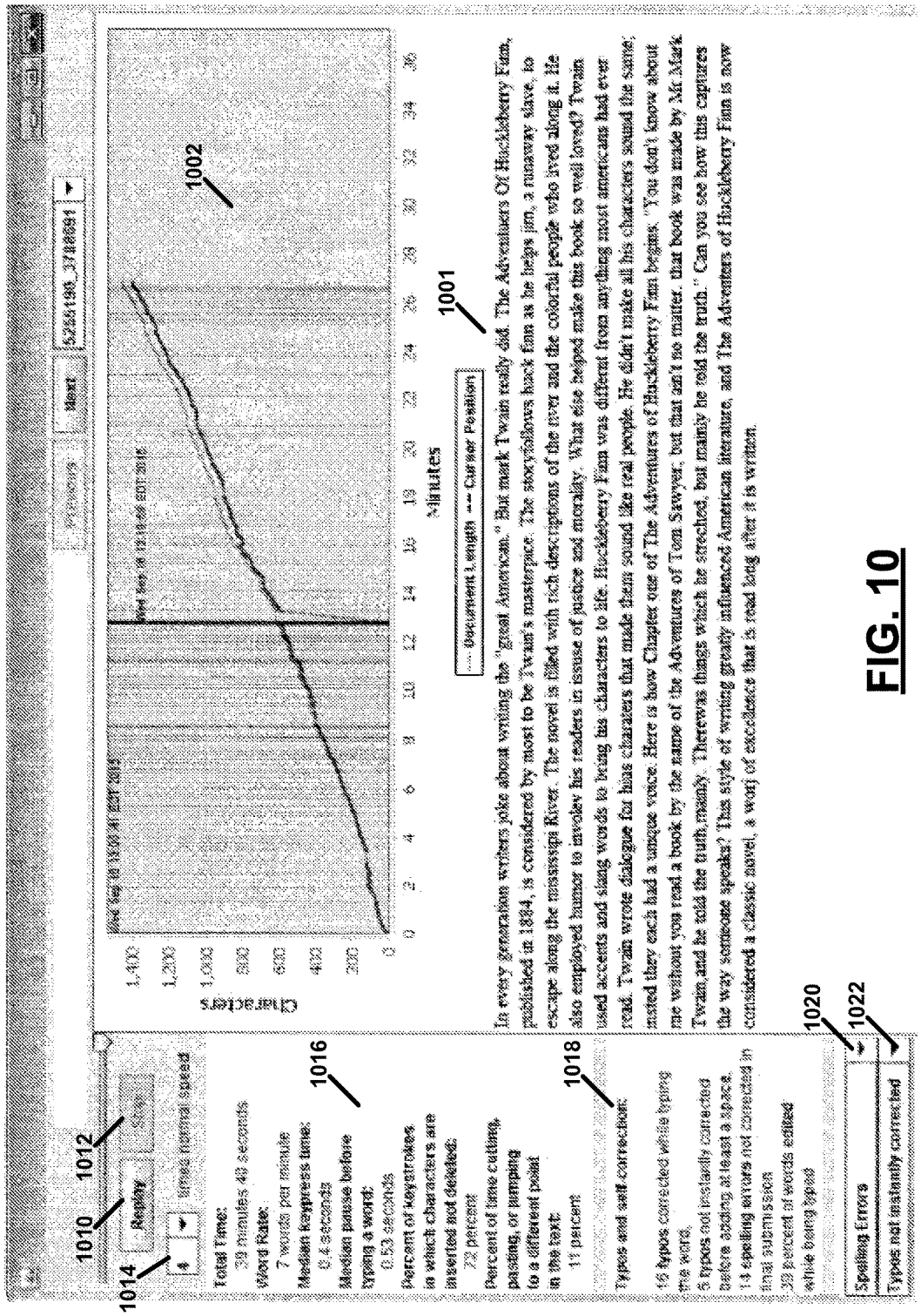
FIG. 10 depicts a graphical user interface (GUI) for viewing a simulated replay of a user's generation of a constructed response.

FIG. 10 depicts a graphical user interface (GUI) for viewing a simulated replay of a user's generation of a constructed response. In examples, the user's actions in generating the constructed response, as reflected by the electronic process log, can be "replayed" at a later point in time. This may enable, for example, a teacher to observe a process by which a student went about writing the constructed response, thus allowing the teacher to identify points in the process where the student struggled, among other information. To generate the simulated replay of the user's generation of the constructed response, the electronic process log is processed. In an example, the simulated replay is provided in a real time fashion, where the speed of the interactions in the simulation matches the speed of user interactions during the generation of the constructed response. In an embodiment, the simulation can be provided in slow motion or fast motion, stopped, and paused.

In the GUI of FIG. 10, a portion 1001 shows the simulated replay. A graph representation at 1002 shows a total number of characters produced (including the ones deleted in the process), and document length, as a function time (e.g., minutes), as well as cursor position at different time point in the composition process. A control 1010 enables the simulation to be played back again upon completion, and a control 1012 enables the simulated replay to be stopped. A control 1014 enables a choice of playback speed of the simulated replay (e.g., normal speed, 4 times normal speed, etc.). The GUI shows various features of the user's writing processes at 1016, 1018, 1020, 1022 (e.g., relating to total time; word rate; median time between keypresses; median time between typing words; percentage of keystrokes in which characters are inserted and not deleted; percentage of time cutting, pasting, or jumping to a different point in the text; number of typos corrected while typing a word; number of typos not instantly corrected before adding at least a space; number of spelling errors not corrected in the final submission; percent of words edited while being typed; etc.). It is noted that the features shown in FIG. 10 are examples only and that various other features may be displayed in the GUI in other examples.

Figure 11:
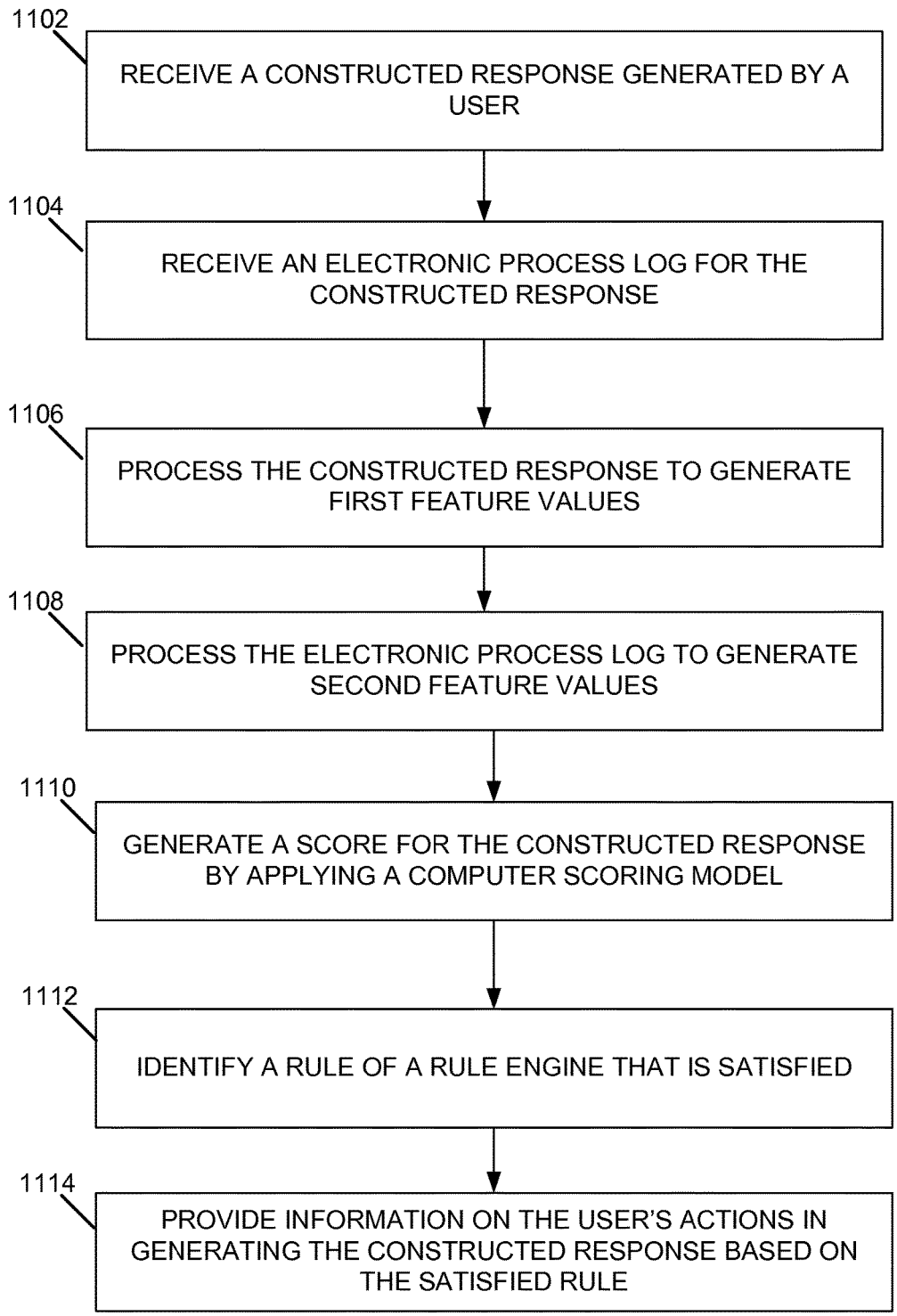
FIG. 11 is a flow diagram depicting example steps of a computer-implemented method for scoring a constructed response generated by a user and providing information on the user's writing behavior.

FIG. 11 is a flow diagram depicting example steps of a computer-implemented method for scoring a constructed response generated by a user and providing information on the user's writing behavior. At 1102, a constructed response generated by a user is received. At 1104, an electronic process log for the constructed response is received. The electronic process log comprises a plurality of time-stamped entries, with each of the entries being associated with a keystroke made by the user in generating the constructed response and indicating a change in text of the constructed response due to the keystroke. At 1106, the constructed response is processed with a processing system to generate first feature values representative of aspects of the constructed response. At 1108, the electronic process log is processed with the processing system to generate second feature values related to the user's actions in generating the constructed response. At 1110, a score for the constructed response is generated using the processing system by applying a computer scoring model (e.g., a statistical computer scoring model) to the first and second feature values. The computer scoring model includes multiple weighted variables that may be determined by training the computer scoring model relative to a plurality of training texts. At 1112, a rule of a rule engine that is satisfied is identified, the rule being satisfied when one or more feature values of the second feature values meet a condition associated with the rule. At 1114, information on the user's actions in generating the constructed response is provided based on the satisfied rule.

Figure 12A:
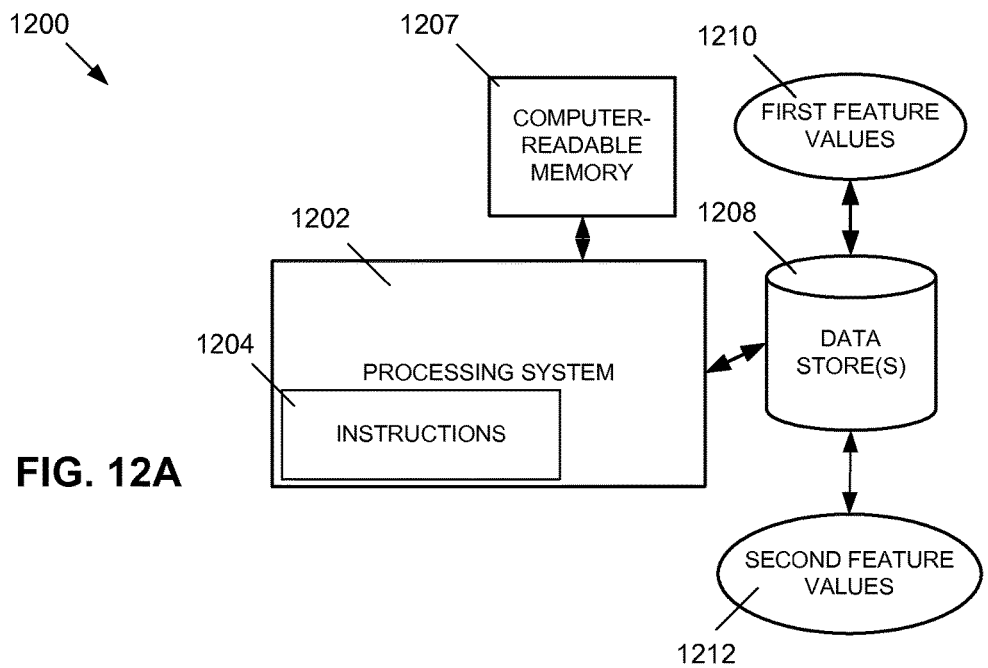
FIGS. 12A, 12B, and 12C depict example systems for scoring a constructed response generated by a user and providing information on the user's writing behavior.
Figure 12B:
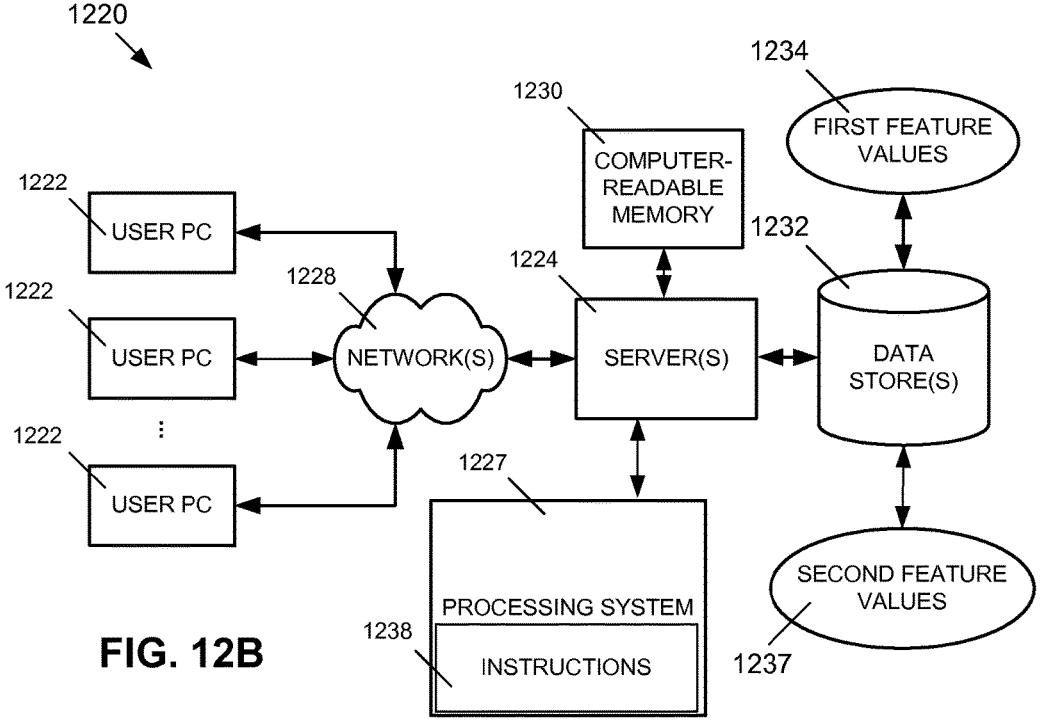
Figure 12C:
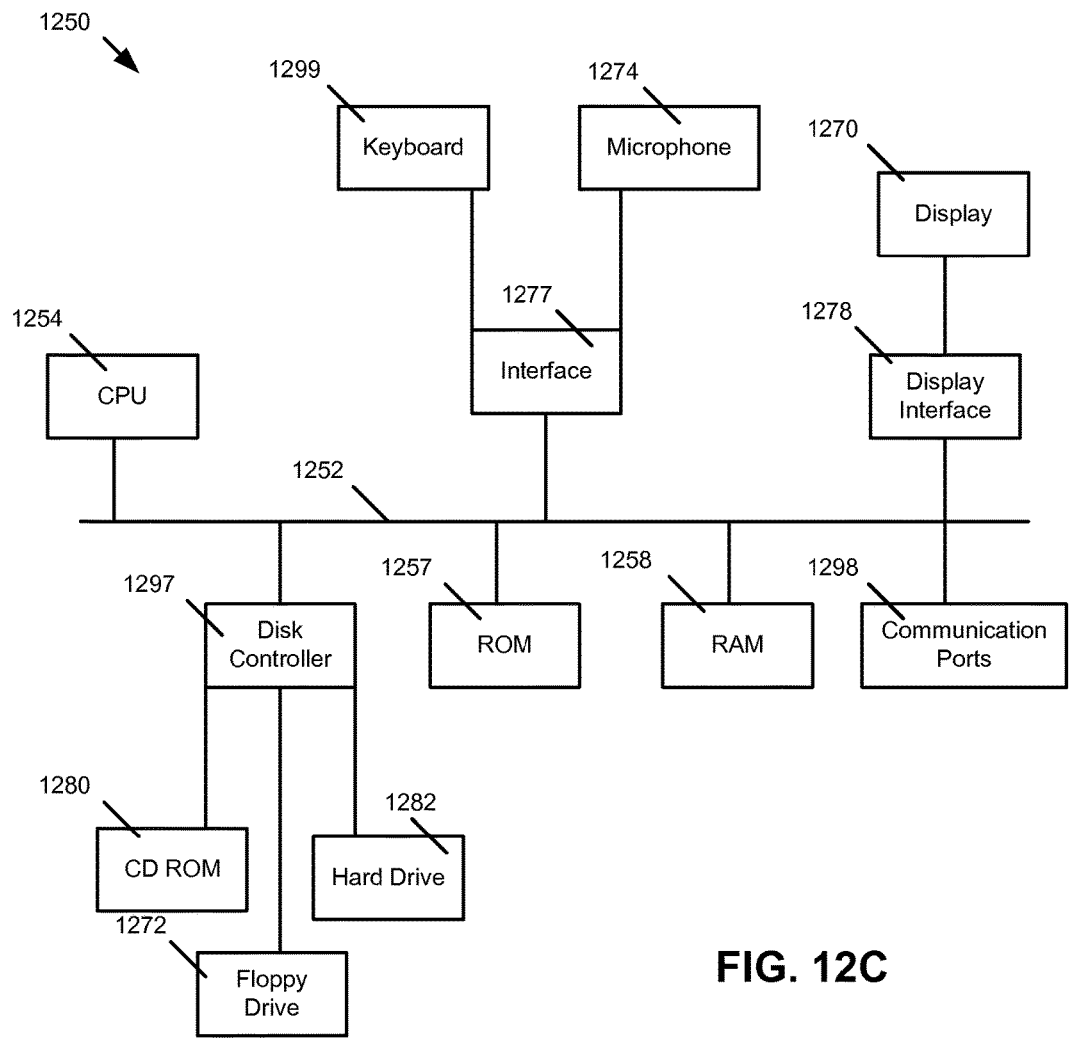

FIGS. 12A, 12B, and 12C depict example systems for scoring a constructed response generated by a user and providing information on the user's writing behavior. For example, FIG. 12A depicts an exemplary system 1200 that includes a standalone computer architecture where a processing system 1202 (e.g., one or more computer processors located in a given computer or in multiple computers that may be separate and distinct from one another) includes instructions 1204 for scoring a constructed response generated by a user and providing information on the user's writing behavior. The processing system 1202 has access to a computer-readable memory 1207 in addition to one or more data stores 1208. The one or more data stores 1208 may include first feature values 1210 as well as second feature values 1212. The processing system 1202 may be a distributed parallel computing environment, which may be used to handle very large-scale data sets.

FIG. 12B depicts a system 1220 that includes a client-server architecture. One or more user PCs 1222 access one or more servers 1224 executing instructions 1238 for scoring a constructed response generated by a user and providing information on the user's writing behavior on a processing system 1227 via one or more networks 1228. The one or more servers 1224 may access a computer-readable memory 1230 as well as one or more data stores 1232. The one or more data stores 1232 may contain first feature values 1234 as well as second feature values 1237.

FIG. 12C shows a block diagram of exemplary hardware for a standalone computer architecture 1250, such as the architecture depicted in FIG. 12A that may be used to contain and/or implement the program instructions of system embodiments of the present disclosure. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1257 and random access memory (RAM) 1258, may be in communication with the processing system 1254 and may contain one or more programming instructions for performing the method for scoring a constructed response generated by a user and providing information on the user's writing behavior. Optionally, program instructions may be stored on a non-transitory computer-readable storage medium such as a magnetic disk, optical disk, recordable memory device, flash memory, or other physical storage medium.

In FIGS. 12A, 12B, and 12C, computer readable memories 1207, 1230, 1257, 1258 or data stores 1208, 1232, 1257, 1258, 1272, 1280, 1282 may include one or more data structures for storing and associating various data used in the example systems for scoring a constructed response generated by a user and providing information on the user's writing behavior. For example, a data structure stored in any of the aforementioned locations may be used to associate feature values and rules of a rule engine. Other aspects of the example systems for scoring a constructed response generated by a user and providing information on the user's writing behavior may be stored and associated in the one or more data structures.

A disk controller 1297 interfaces one or more optional disk drives to the system bus 1252. These disk drives may be external or internal floppy disk drives such as 1272, external or internal CD-ROM, CD-R, CD-RW or DVD drives such as 1280, or external or internal hard drives 1282. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1297, the ROM 1257 and/or the RAM 1258. The processor 1254 may access one or more components as required.

A display interface 1278 may permit information from the bus 1252 to be displayed on a display 1270 in audio, graphic, or alphanumeric format. Communication with external devices may optionally occur using various communication ports 1298.

In addition to these computer-type components, the hardware may also include data input devices, such as a keyboard 1299, or other input device 1274, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for scoring a constructed response generated by a user and providing information on the user's writing behavior, the method comprising:
   receiving a constructed response generated by a user;
   generating an electronic process log for the constructed response that comprises a plurality of time-stamped entries, each of the entries being associated with a keystroke made by the user in generating the constructed response and indicating a change in text of the constructed response due to the keystroke, wherein the generating of the electronic process log includes
      using an event handler to determine that the user has pressed a key on a keyboard, the event handler generating an event based on the pressing of the key, processing the event to determine which key was pressed,
      storing in a first data structure the text of the constructed response prior to the pressing of the key, and storing in a second data structure the text of the constructed response after the pressing of the key, and
      comparing data of the first and second data structures to determine the change in the text of the constructed response due to the pressing of the key;
   processing the constructed response with a processing system to generate first feature values representative of aspects of the constructed response;
   processing the electronic process log with the processing system to generate second feature values related to the user's actions in generating the constructed response;
   generating a score for the constructed response using the processing system by applying a computer scoring model to the first and second feature values, the computer scoring model comprising multiple weighted variables determined by training the computer scoring model relative to a plurality of training texts;
   identifying a rule of a rule engine that is satisfied, the rule being satisfied when one or more feature values of the second feature values meet a condition associated with the rule; and
   providing information on the user's actions in generating the constructed response based on the satisfied rule.

2. The computer-implemented method of claim 1, wherein the rule engine comprises multiple rules that each include (i) a condition, and (ii) an associated action, the providing of the information on the user's actions comprising:
   performing an action associated with the satisfied rule, wherein the performing of the action includes (i) calculating a second score based on the one or more feature values that meet the condition, or (ii) returning feedback including a predetermined response, the predetermined response comprising a fixed string or a template with variables filled based on the one or more feature values.

3. The computer-implemented method of claim 1, wherein each entry of the process log comprises:
   first data indicating a position in the text where the change occurred;
   second data indicating one or more characters removed from the text due to the keystroke, the second data being null when no characters are removed due to the keystroke;
   third data indicating one or more characters added to the text due to the keystroke, the third data being null when no characters are added due to the keystroke; and
   fourth data indicating a timestamp associated with the keystroke.

4. The computer-implemented method of claim 1, wherein the received constructed response comprises a plurality of word tokens, and wherein the generation of the second feature values comprises:
   associating keystrokes of the electronic process log with the word tokens of the constructed response to create a history for each word token; and
   using the history of a word token to classify the word token into one or more categories that include (i) a first category indicating that the word token was misspelled at a time of its first production, (ii) a second category indicating that the word token is a correction of a typographical error, (iii) a third category indicating that the generation of the word token included minor editing, (iv) a fourth category indicating that the generation of the word token included major editing, and (v) a fifth category indicating that the word token is a replacement of a different word, wherein one or more of the second feature values are generated based on the classifications of the word tokens into the one or more categories.

5. The computer-implemented method of claim 1, wherein the second feature values include one or more values indicative of a keyboarding skill of the user.

6. The computer-implemented method of claim 5, wherein the generation of the one or more values indicative of the keyboarding skill of the user comprises:
generating a set of words that are used frequently in writing;
identifying instances of words of the set of words in the constructed response;
processing the electronic process log to determine intervals of time between the user's keystrokes in generating the identified instances; and
calculating a mean interval of time or median interval of time for the determined intervals of time, wherein the one or more values indicative of the keyboarding skill of the user include the mean or median interval of time.

7. The computer-implemented method of claim 1, wherein the generation of the second feature values comprises:
processing the electronic process log to determine instances of multiple-word deletions in the generation of the constructed response; and
processing the electronic process log to classify each of the multiple-word deletions into a category of categories that include (i) a first category indicating that the deleted words were subsequently retyped by the user, (ii) a second category indicating that the deleted words included a spelling error that was subsequently corrected by the user, (iii) a third category indicating that the deleted words included an original n-gram sequence that was subsequently replaced by a new n-gram sequence having a high degree of similarity to the original, and (iv) a fourth category indicating that the multiple-word deletion is not classified into any of the first, second, and third categories, wherein one or more of the second feature values are generated based on the classifications of the multiple-word deletions into the categories.

8. The computer-implemented method of claim 1, further comprising:
generating, using the processing system, visual data based on the electronic process log, the visual data comprising a simulated replay of the user's generation of the constructed response, wherein a speed at which actions occur in the simulated replay is based on a speed at which the actions occurred during the generation of the constructed response.

9. A system for scoring a constructed response generated by a user and providing information on the user's writing behavior, the system comprising:
a processing system; and
computer-readable memory in communication with the processing system encoded with instructions for commanding the processing system to execute steps comprising:
receiving a constructed response generated by a user;
generating an electronic process log for the constructed response that comprises a plurality of time-stamped entries, each of the entries being associated with a keystroke made by the user in generating the constructed response and indicating a change in text of the constructed response due to the keystroke, wherein the generating of the electronic process log includes
using an event handler to determine that the user has pressed a key on a keyboard, the event handler generating an event based on the pressing of the key,
processing the event to determine which key was pressed,
storing in a first data structure the text of the constructed response prior to the pressing of the key, and storing in a second data structure the text of the constructed response after the pressing of the key, and
comparing data of the first and second data structures to determine the change in the text of the constructed response due to the pressing of the key;
processing the constructed response to generate first feature values representative of aspects of the constructed response;
processing the electronic process log to generate second feature values related to the user's actions in generating the constructed response;
generating a score for the constructed response by applying a computer scoring model to the first and second feature values, the computer scoring model comprising multiple weighted variables determined by training the computer scoring model relative to a plurality of training texts;
identifying a rule of a rule engine that is satisfied, the rule being satisfied when one or more feature values of the second feature values meet a condition associated with the rule; and
providing information on the user's actions in generating the constructed response based on the satisfied rule.

10. The system of claim 9, wherein the rule engine comprises multiple rules that each include (i) a condition, and (ii) an associated action, and wherein in the providing of the information on the user's actions, the instructions command the processing system to execute the steps comprising:
performing an action associated with the satisfied rule, wherein the performing of the action includes (i) calculating a second score based on the one or more feature values that meet the condition, or (ii) returning feedback including a predetermined response, the predetermined response comprising a fixed string or a template with variables filled based on the one or more feature values.

11. The system of claim 9, wherein each entry of the process log comprises:
first data indicating a position in the text where the change occurred;
second data indicating one or more characters removed from the text due to the keystroke, the second data being null when no characters are removed due to the keystroke;
third data indicating one or more characters added to the text due to the keystroke, the third data being null when no characters are added due to the keystroke; and
fourth data indicating a timestamp associated with the keystroke.

12. The system of claim 9, wherein the received constructed response comprises a plurality of word tokens, and wherein in the generating of the second feature values, the instructions command the processing system to execute the steps comprising:

associating keystrokes of the electronic process log with the word tokens of the constructed response to create a history for each word token; and using the history of a word token to classify the word token into one or more categories that include (i) a first category indicating that the word token was misspelled at a time of its first production, (ii) a second category indicating that the word token is a correction of a typographical error, (iii) a third category indicating that the generation of the word token included minor editing, (iv) a fourth category indicating that the generation of the word token included major editing, and (v) a fifth category indicating that the word token is a replacement of a different word, wherein one or more of the second feature values are generated based on the classifications of the word tokens into the one or more categories.

13. The system of claim 9, wherein the second feature values include one or more values indicative of a keyboarding skill of the user.

14. The system of claim 13, wherein in the generating of the one or more values indicative of the keyboarding skill of the user, the instructions command the processing system to execute the steps comprising:

generating a set of words that are used frequently in writing;

identifying instances of words of the set of words in the constructed response;

processing the electronic process log to determine intervals of time between the user's keystrokes in generating the identified instances; and calculating a mean interval of time or median interval of time for the determined intervals of time, wherein the one or more values indicative of the keyboarding skill of the user include the mean or median interval of time.

15. The system of claim 9, wherein in the generating of the second feature values, the instructions command the processing system to execute the steps comprising:

processing the electronic process log to determine instances of multiple-word deletions in the generation of the constructed response; and processing the electronic process log to classify each of the multiple-word deletions into a category of categories that include (i) a first category indicating that the deleted words were subsequently retyped by the user, (ii) a second category indicating that the deleted words included a spelling error that was subsequently corrected by the user, (iii) a third category indicating that the deleted words included an original n-gram sequence that was subsequently replaced by a new n-gram sequence having a high degree of similarity to the original, and (iv) a fourth category indicating that the multiple-word deletion is not classified into any of the first, second, and third categories, wherein one or more of the second feature values are generated based on the classifications of the multiple-word deletions into the categories.

16. The system of claim 9, wherein the instructions command the processing system to execute the steps comprising:

generating, using the processing system, visual data based on the electronic process log, the visual data comprising a simulated replay of the user's generation of the constructed response, wherein a speed at which actions occur in the simulated replay is based on a speed at which the actions occurred during the generation of the constructed response.

17. A non-transitory computer-readable storage medium for scoring a constructed response generated by a user and providing information on the user's writing behavior, the computer-readable storage medium comprising computer executable instructions which, when executed, cause a processing system to execute steps including:

receiving a constructed response generated by a user;

generating an electronic process log for the constructed response that comprises a plurality of time-stamped entries, each of the entries being associated with a keystroke made by the user in generating the constructed response and indicating a change in text of the constructed response due to the keystroke, wherein the generating of the electronic process log includes using an event handler to determine that the user has pressed a key on a keyboard, the event handler generating an event based on the pressing of the key, processing the event to determine which key was pressed, storing in a first data structure the text of the constructed response prior to the pressing of the key, and storing in a second data structure the text of the constructed response after the pressing of the key, and comparing data of the first and second data structures to determine the change in the text of the constructed response due to the pressing of the key;

processing the constructed response to generate first feature values representative of aspects of the constructed response;

processing the electronic process log to generate second feature values related to the user's actions in generating the constructed response;

generating a score for the constructed response by applying a computer scoring model to the first and second feature values, the computer scoring model comprising multiple weighted variables determined by training the computer scoring model relative to a plurality of training texts;

identifying a rule of a rule engine that is satisfied, the rule being satisfied when one or more feature values of the second feature values meet a condition associated with the rule; and providing information on the user's actions in generating the constructed response based on the satisfied rule.

18. The non-transitory computer-readable storage medium of claim 17, wherein the rule engine comprises multiple rules that each include (i) a condition, and (ii) an associated action, and wherein in the providing of the information on the user's actions, the instructions cause the processing system to execute the steps comprising:

performing an action associated with the satisfied rule, wherein the performing of the action includes (i) calculating a second score based on the one or more feature values that meet the condition, or (ii) returning feedback including a predetermined response, the predetermined response comprising a fixed string or a template with variables filled based on the one or more feature values.

19. The non-transitory computer-readable storage medium of claim 17, wherein each entry of the process log comprises:

first data indicating a position in the text where the change occurred;

second data indicating one or more characters removed from the text due to the keystroke, the second data being null when no characters are removed due to the keystroke;

third data indicating one or more characters added to the text due to the keystroke, the third data being null when no characters are added due to the keystroke; and fourth data indicating a timestamp associated with the keystroke.

\* \* \* \* \*